US008478301B2

(12) United States Patent
Kohno et al.

(10) Patent No.: US 8,478,301 B2
(45) Date of Patent: *Jul. 2, 2013

(54) COMMUNICATION DEVICE, COMMUNICATION SYSTEM, PROGRAM, AND DATA SELECTION METHOD

(75) Inventors: Michinari Kohno, Tokyo (JP); Kenji Yamane, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 578 days.

This patent is subject to a terminal disclaimer.

(21) Appl. No.: 12/741,744

(22) PCT Filed: Aug. 28, 2008

(86) PCT No.: PCT/JP2008/065362
§ 371 (c)(1),
(2), (4) Date: May 6, 2010

(87) PCT Pub. No.: WO2009/063674
PCT Pub. Date: May 22, 2009

(65) Prior Publication Data
US 2010/0267335 A1    Oct. 21, 2010

(30) Foreign Application Priority Data

Nov. 15, 2007  (JP) .................................. 2007-297154
Mar. 27, 2008  (JP) .................................. 2008-082884

(51) Int. Cl.
*H04W 24/00*       (2009.01)
(52) U.S. Cl.
USPC ...................................... 455/456.3; 455/466

(58) Field of Classification Search
USPC .............. 455/456.3, 41.2, 41.3, 414.2, 414.3, 455/466, 456.1, 67.11, 63.1
See application file for complete search history.

(56) References Cited

U.S. PATENT DOCUMENTS 6,052,064 A * 4/2000 Budnik et al. ............... 340/7.24
6,087,961 A   7/2000 Markow
(Continued)

FOREIGN PATENT DOCUMENTS

EP   1 489 432 A1   6/2004
EP   1 811 426 A2   7/2007
(Continued)

OTHER PUBLICATIONS

Extended European Search Report issued Sep. 6, 2012, in Munich in European Application No. EP 08 84 9521.

(Continued)

*Primary Examiner* — Lewis West
(74) *Attorney, Agent, or Firm* — Finnegan, Henderson, Farabow, Garrett & Dunner, L.L.P.

(57) ABSTRACT

The present invention aims to enable appropriate selection of data to be transmitted/received based on the distance between communication devices. A communication device including, a memory unit that stores a plurality of data, a distance information obtaining unit that obtains distance information on a distance from a radio communication device and a data selection unit that selects data from the plurality of data stored in the memory unit based on the distance information obtained by the distance information obtaining unit is provided. The distance information obtaining unit may estimate and obtain the distance information based on a field intensity of a radio signal determined to satisfy a predetermined condition about a noise component among radio signals received from the other radio communication device.

10 Claims, 22 Drawing Sheets

U.S. PATENT DOCUMENTS

| | | |
|---|---|---|
| 2004/0214565 A1 | 10/2004 | Shinmei |
| 2005/0170848 A1* | 8/2005 | Sato et al. .................. 455/456.3 |
| 2005/0209921 A1 | 9/2005 | Roberts et al. |
| 2005/0228613 A1 | 10/2005 | Fullerton et al. |
| 2006/0267841 A1 | 11/2006 | Lee et al. |
| 2007/0060170 A1 | 3/2007 | Fukui |

FOREIGN PATENT DOCUMENTS

| | | |
|---|---|---|
| JP | 5-167471 | 7/1993 |
| JP | 2002-300545 | 10/2002 |
| JP | 2002-300548 | 10/2002 |
| JP | 2002-325211 | 11/2002 |
| JP | 2004-32394 | 1/2004 |
| JP | 2004-328542 | 11/2004 |
| JP | 2005-301428 | 10/2005 |
| JP | 2005-301804 | 10/2005 |
| JP | 2006-81036 | 3/2006 |
| JP | 2006-253765 | 9/2006 |
| JP | 2006-300918 | 11/2006 |
| JP | 2007-71816 | 3/2007 |
| JP | 2007-142944 | 6/2007 |
| JP | 2007-189726 | 7/2007 |
| KR | 10-2008-0069337 | 7/2008 |

OTHER PUBLICATIONS

International Search Report from Japanese Patent Office for PCT International Application PCT/JP2008/065362, mailing date Oct. 7, 2008.

Yamada, N. et al., "Indoor Area Estimation Based on Propagation Loss Characteristics of Wireless LAN," IEICE Technical Report, vol. 105, No. 627, pp. 181-184, (2006).

English-language Extended European Search Report issued Jul. 20, 2012, in Munich in corresponding European Application No. EP 08 85 0303.

English-language Extended European Search Report issued Jul. 17, 2012, in Munich in corresponding European Application No. EP 08 85 0127.

English-language Extended European Search Report issued Jul. 5, 2012, in Munich in corresponding European Application No. EP 08 79 2400.

Notification of Reasons for Refusal issued by the Japanese Patent Office on Sep. 21, 2012, for corresponding Japanese Patent Application No. 2008-068226.

* cited by examiner

| DEVICE INFORMATION | EVALUATION FORMULA |
|---|---|
| Model 001 | EVALUATION FORMULA 1 |
| Model 002 | EVALUATION FORMULA 2 |
| Model 003 | EVALUATION FORMULA 3 |
| Model 004 | EVALUATION FORMULA 4 |

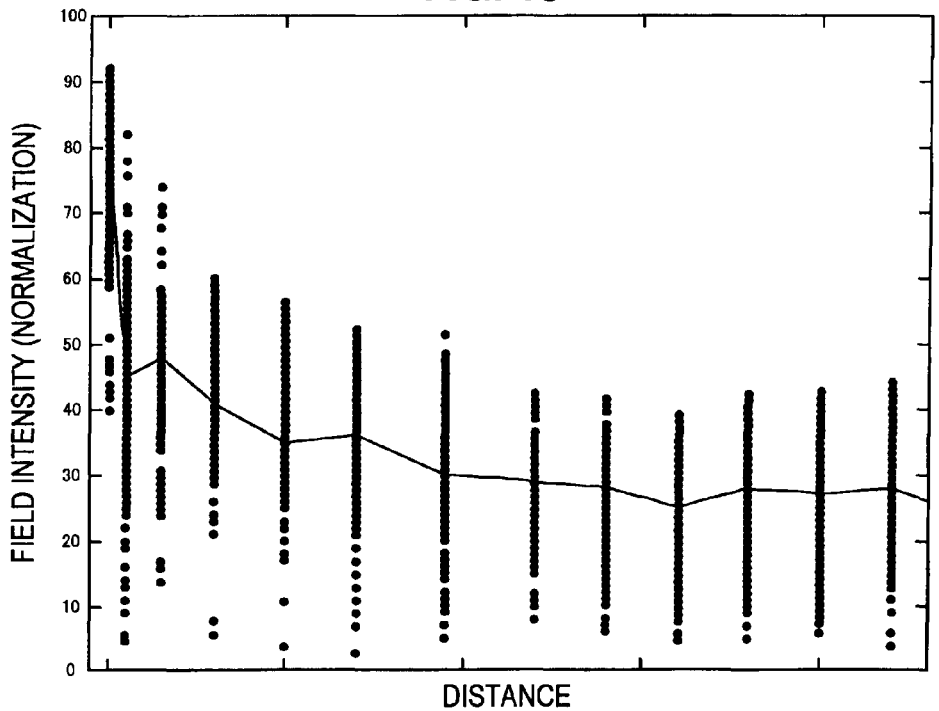
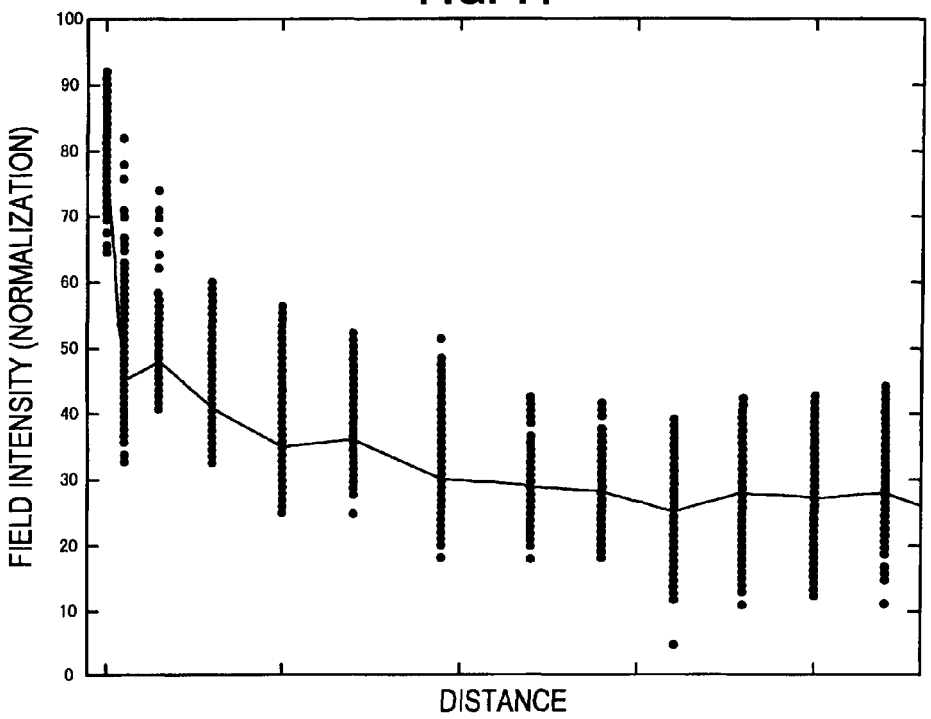

FIG. 18

| BEFORE SELECTION | AFTER SELECTION | | |
|---|---|---|---|
| INITIAL DATA | LONG DISTANCE | MEDIUM DISTANCE | SHORT DISTANCE |
| IT01 | IT01(LOW) | IT11(MEDIUM) | IT21(HIGH) |
| IT02 | IT02(LOW) | IT12(MEDIUM) | IT22(HIGH) |
| IT03 | IT03(LOW) | IT13(MEDIUM) | IT23(HIGH) |

FIG. 25

| LONG DISTANCE | MEDIUM DISTANCE | SHORT DISTANCE |
|---|---|---|
| PRODUCT NAME | OVERVIEW DESCRIPTION | DETAILED DESCRIPTION |
| PRODUCT IMAGE | MOTION PICTURE ADVERTISEMENT | MOTION PICTURE ADVERTISEMENT |
| — | — | BONUS INFORMATION |

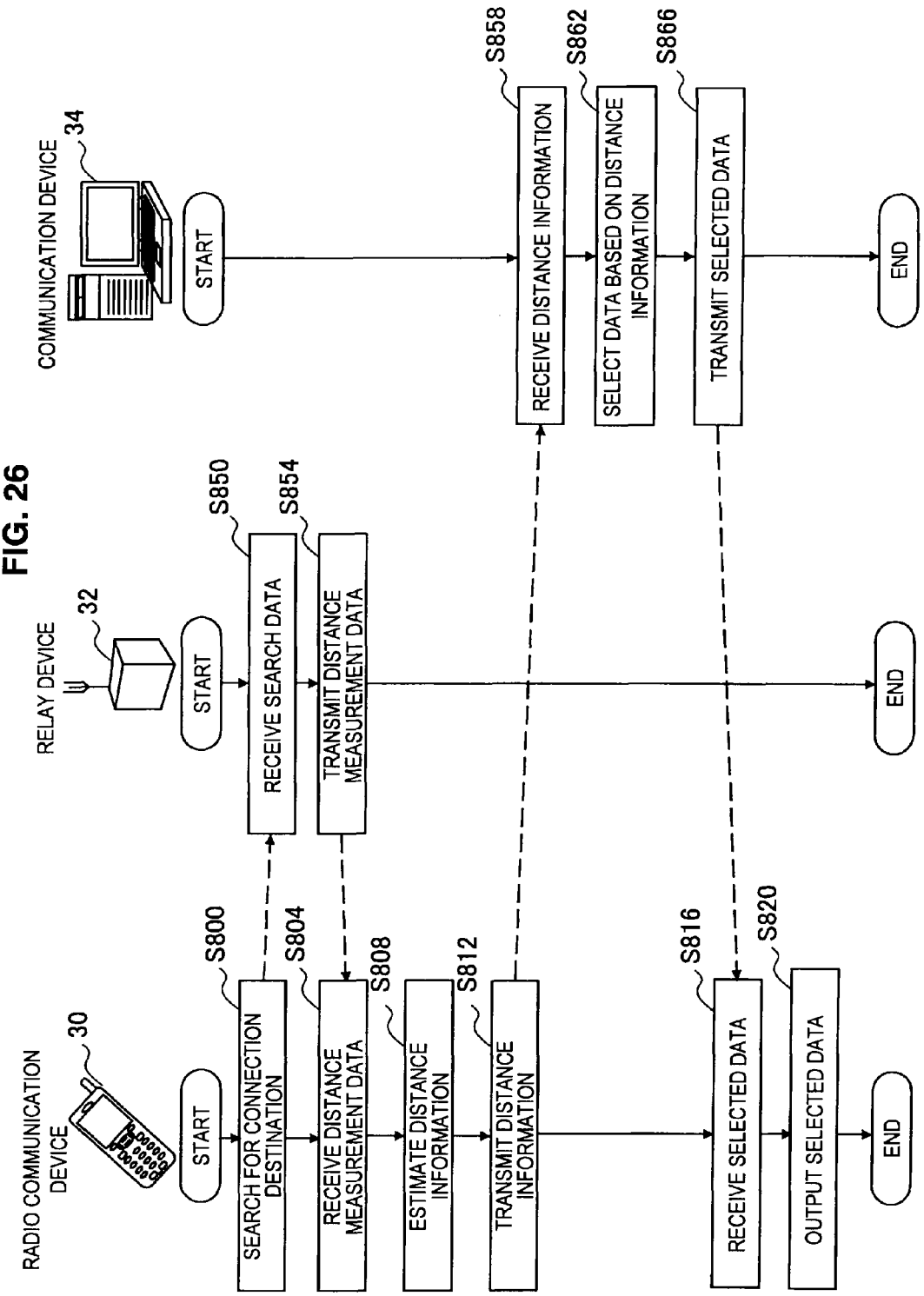

COMMUNICATION DEVICE, COMMUNICATION SYSTEM, PROGRAM, AND DATA SELECTION METHOD

CROSS REFERENCE TO RELATED APPLICATIONS

This application is a National Phase Application of International Application Number PCT/JP2008/065362, filed Aug. 28, 2008, and claims the priority of Japanese Patent Application Nos. 2007-297154, filed Nov. 15, 2007, and 2008-082884, filed Mar. 27, 2008, the content of all of which are incorporated herein by reference.

TECHNICAL FIELD

The present invention relates to a communication device, a communication system, a program, and a data selection method.

BACKGROUND ART

A data exchange service or a contents distribution service are in practical use today as one aspect of services using a communication device with a radio communication function. For example, in a network game using portable game terminals, an item obtained in one portable game terminal is passed to another portable game terminal by radio communication. Further, there is a service that distributes advertisement contents from a radio base station placed in a particular store or the like to communication terminals located in close proximity for the purpose of advertisement for a sales promotion.

In such a data exchange service or contents distribution service, a promotion of use of service or an increase in entertainment value are expected by appropriately selecting data to be passed according to the degree of interest of a user, the closeness between users or the like. Then, use of the distance between communication devices that perform radio communication is considered as a parameter to measure the degree of interest of a user or the closeness between users.

The field intensity of a radio signal transmitted from a communication device that performs radio communication is known to be inversely proportional to the square or cube of the distance in close proximity to the communication device being a signal transmission source and inversely proportional to the distance in no proximity in the ideal space. Such characteristics of the field intensity of a radio signal are established also in the wireless LAN (Local Area Network) specifications such as IEEE 802.11b or 11g. A technique of estimating the distance between communication devices that perform radio communication with use of such characteristics of the field intensity of a radio signal is described in Patent Literature 1, for example.

Patent Literature 1: JP 2006-300918 (A)

DISCLOSURE OF INVENTION

Technical Problem

However, in reality, the field intensity of a radio signal is affected by interference fading, polarization fading, skip fading or the like. Therefore, the field intensity of a radio signal generally keeps varying without being stabilized even when the distance from the communication device being a signal transmission source remains constant. It has thus been difficult to estimate an accurate distance between communication devices in hitherto known radio communication, and a data exchange service or contents distribution service according to the distance between communication devices has not been implemented.

The present invention is made in view of the above-mentioned issue, and aims to provide a novel and improved communication device, communication system, program, and data selection method that enable appropriate selection of data to be transmitted/received based on the distance between communication devices.

Technical Solution

According to an aspect of the present invention in order to achieve the above-mentioned object, there is provided a communication device including, a memory unit that stores a plurality of data, a distance information obtaining unit that obtains distance information on a distance from other radio communication device and a data selection unit that selects data from the plurality of data stored in the memory unit based on the distance information obtained by the distance information obtaining unit. In this configuration, the data selection unit selects data from the plurality of data stored in the memory unit based on the distance information on a distance from other radio communication device obtained by the distance information obtaining unit.

According to another aspect of the present invention in order to achieve the above-mentioned object, there is provided a program causing a computer controlling a communication device to function as, a distance information obtaining unit that obtains distance information on a distance from other radio communication device and a data selection unit that selects data from a plurality of data stored in a memory unit of the communication device based on the distance information obtained by the distance information obtaining unit.

According to another aspect of the present invention in order to achieve the above-mentioned object, there is provided a data selection method in a communication device including the steps of obtaining distance information on a distance from other radio communication device and selecting data from a plurality of data stored in a memory unit based on the obtained distance information.

According to another aspect of the present invention in order to achieve the above-mentioned object, there is provided a communication system including a communication device including a memory unit that stores a plurality of data, a distance information obtaining unit that obtains distance information on a distance from a radio communication device and a data selection unit that selects data from the plurality of data stored in the memory unit based on the distance information obtained by the distance information obtaining unit and the radio communication device that performs radio communication with the communication device.

Advantageous Effects of Invention

As described above, the communication device, the communication system, the program, and the data selection method according to the present invention enable appropriate selection of data to be transmitted/received based on the distance between communication devices.

BRIEF DESCRIPTION OF DRAWINGS

FIG. 10 is an explanatory view showing an illustrative example of distances between a plurality of radio communication devices and field intensities before filtering by a determination unit.

FIG. 11 is an explanatory view showing an illustrative example of distances between a plurality of radio communication devices and field intensities after filtering by a determination unit.

FIG. 18 is an explanatory view showing an illustrative example of a plurality of data stored in a memory unit.

FIG. 25 is an explanatory view showing another example of a plurality of data stored in a memory unit.

FIG. 26 is a flowchart showing an example of an operation flow related to data selection.

EXPLANATION OF REFERENCE 1, 2 communication system
20, 30 radio communication device (one embodiment of communication device) communication device
228 memory unit
250 distance information obtaining unit
260 data selection unit

BEST MODE FOR CARRYING OUT THE INVENTION

Hereinafter, preferred embodiments of the present invention will be described in detail with reference to the appended drawings. Note that, in this specification and the drawings, elements that have substantially the same function and structure are denoted with the same reference signs, and repeated explanation is omitted.

"Best Mode for Carrying out the invention" will be described hereinafter in the following order.

[1] Overview of communication system
[2] Estimation of distance information based on radio signal
  [2-1] Hardware configuration of radio communication device
  [2-2] Functions of radio communication device
  [2-3] Operation of radio communication device
[3] Data selection based on distance information
  [3-1] First embodiment
  [3-2] Second embodiment
  [3-3] Third embodiment
  [3-4] Fourth embodiment
[4] Summary

[1] Overview of Communication System

Firstly, communication systems according to four embodiments described in this specification are schematically described with reference to FIGS. 1 and 2.

Figure 1:
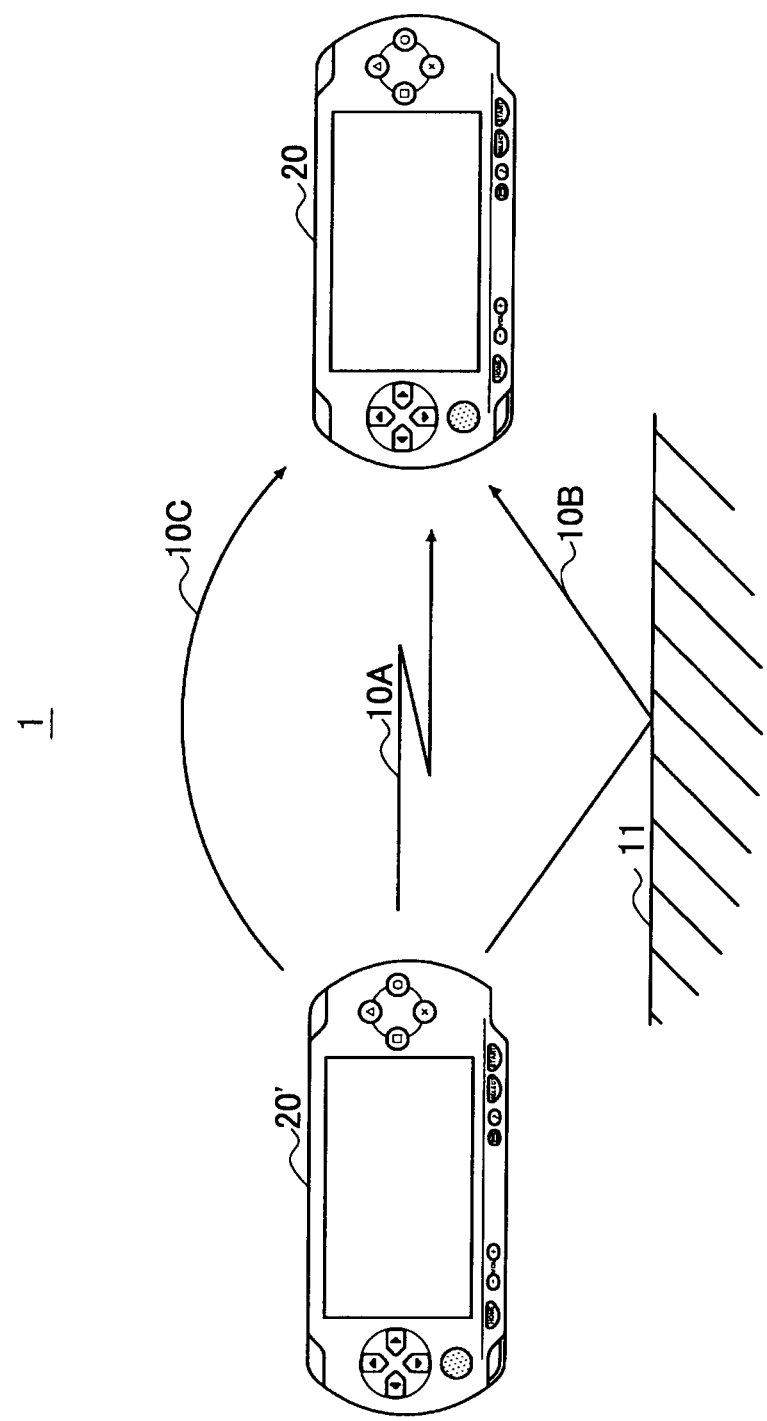
FIG. 1 is an explanatory view showing one example of a configuration of a radio communication system.

FIG. 1 is an explanatory view showing a configuration of a communication system 1 according to first, second and third embodiments, which are described later. The communication system 1 shown in FIG. 1 includes radio communication devices 20 and 20' as communication devices that perform communication with each other over a radio signal.

The radio communication devices 20 and 20' can transmit/receive radio signals including various data (text data, streaming data, distance measurement packet etc.) with each other. The various data include data such as items used in games and events, video data such as advertisement programs, music data, movies, television programs, video programs, photographs, documents, pictures and charts, arbitrary data used in software or the like.

Further, in FIG. 1, portable game machines are shown as examples of the radio communication devices 20 and 20; however, the radio communication devices 20 and 20' are not limited to those portable game machines. For example, the radio communication devices 20 and 20' may be such as PCs (Personal Computers), household video processors (DVD recorder, videocassette recorder and the like), mobile phones, PHSs (Personal Handyphone Systems). Moreover, the radio communication devices 20 and 20' may be information processing devices, such as portable music players, portable video processors, PDAs (Personal Digital Assistants), household game machines and household electric appliances.

Here, the radio communication devices 20 and 20' may perform radio communication using a frequency bandwidth of 2.4 GHz that is specified in IEEE 802.11b or may perform radio communication using a frequency bandwidth specified in IEEE 802.11a, g and n. Further, the radio communication devices 20 and 20' may operate using ZigBee that is specified in IEEE 802.15.4. Further, FIG. 1 shows the radio communication system 1 of an ad-hoc mode in which the radio communication devices 20 and 20' directly communicate with each other; however, the radio communication system 1 may be in an infrastructure mode in which the radio communication devices 20 and 20' communicate via a base station. Furthermore, in the communication system 1, in addition to point-to-point radio communication but also point-to-multipoint or multipoint-to-multipoint radio communication can be realized.

The field intensity of a radio signal transmitted from the radio communication device 20 or 20' are affected by interference fading, polarization fading, skip fading or the like. Interference fading is a phenomenon in which radio signals, which are propagated via a plurality of paths and come to a receiving point, interfere with each other at the receiving point. Further, polarization fading is a phenomenon in which a rotation of a plane of polarization occurs during a propagation of radio signals and radio waves having different planes of polarization interfere with each other at a receiving point. Furthermore, skip fading is a phenomenon in which an interference occurs due to an affect of the ionosphere around the earth.

For example, as shown in FIG. 1, when the radio communication device 20' transmits a radio signal, the radio communication device 20 receives the radio signal as a direct wave 10A, a reflected wave 10B (reflected by a subject 11) or a diffracted wave 10C, for example.

Thus, the field intensity of the radio signal received by the radio communication device 20 from the radio communication device 20' constantly varies. Particularly, since the portable game machines described as examples of the radio communication devices 20 and 20' have a low transmitting power, those portable game machines are easily affected by fading. Thus, a radio communication device cannot estimate an accurate distance from the transmission source device of the radio signal by using the field intensity of all radio signals received in a certain period of time.

Figure 2:
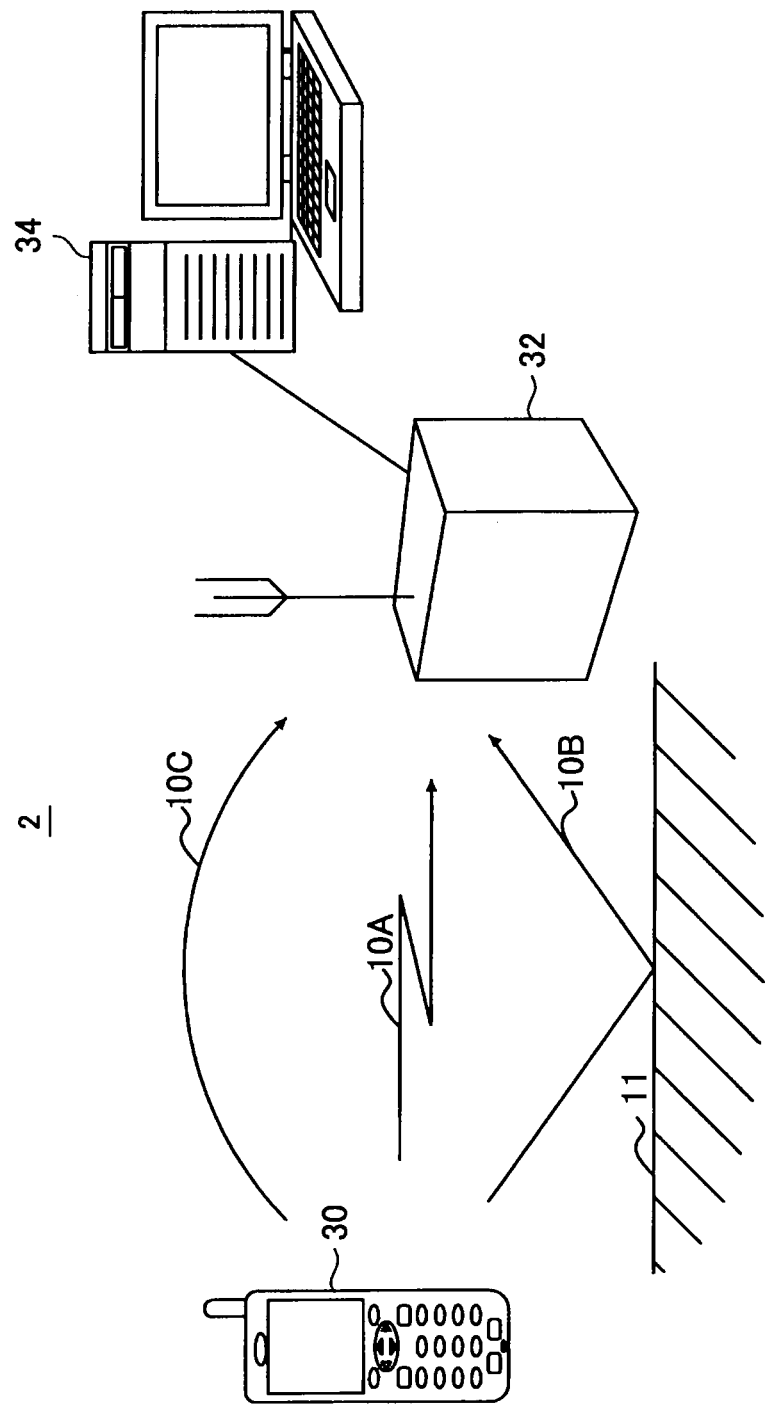
FIG. 2 is an explanatory view showing another example of a configuration of a radio communication system.

FIG. 2 is an explanatory view showing a configuration of a communication system 2 according to a fourth embodiment, which is described later. The communication system 2 shown in FIG. 2 includes three kinds of communication devices: a radio communication device 30, a relay device 32 and a communication device 34.

The radio communication device 30 can transmit/receive radio signals including various data (text data, streaming data, distance measurement packet etc.) to/from the relay device 32. The various data include data such as items used in games and events, video data such as advertisement programs, movies, television programs, video programs, photographs, documents, pictures and charts, arbitrary data used in software and so on.

When the radio communication device 30 transmits the above-described various data to the relay device 32, the relay device 32 relays those data to the communication device 34. Further, when the communication device 34 transmits the various data to the relay device 32, the relay device 32 relays those data to the radio communication device 30 in the same manner.

Although a mobile phone is shown as an example of the radio communication device 30 in FIG. 2, the radio communication device 30 is not limited to a mobile phone. For example, the radio communication device 30 may be an information processing device such as a PC, household video processor, portable game machine, PHS, portable music player, portable video processor, PDA, household game machine, or household electric appliance.

The relay device 32 is one embodiment of the radio communication device, and an access point for radio communication is shown as an example in FIG. 2. However, the relay device 32 is not limited to an access point for radio communication. For example, the relay device 32 may be a radio base station, a communication device such as a router having a radio communication function, an information processing device illustrated in relation to the radio communication device 30 or the like.

The communication device 34 is a device that performs communication with the radio communication device 30 via the relay device 32. In FIG. 2, the communication device 34 is shown as a general-purpose computer such as a PC by way of illustration. However, the communication device 34 is not limited to a general-purpose computer. For example, the communication device 34 may be an information processing device such as a WEB server or an application server, a control device of a radio base station, a server device placed in a store or home or the like.

The relay device 32 and the communication device 34 are connected through an arbitrary communication network. The communication network that connects the devices may be the Internet, leased line, VPN (Virtual Private Network), LAN, WAN (Wide Area Network) or the like. Further, the communication network that connects the devices may be wired or wireless.

The radio communication device 30 and the relay device 32 perform arbitrary radio communication described in relation to the radio communication devices 20 and 20' in FIG. 1; for example, radio communication using a frequency bandwidth of 2.4 GHz specified in IEEE 802.11b. The field intensity of a radio signal between the radio communication device 30 and the relay device 32 also varies constantly, affected by interference fading, polarization fading, skip fading or the like. Thus, the radio communication device 30 cannot estimate an accurate distance from the relay device 32 by using radio signals even with use of the field intensity of all radio signals received in a certain period of time.

In view of the above issue, a radio communication device that estimates distance information based on a radio signal has been invented. The radio communication device can estimate a distance from a transmission source of a radio signal with higher accuracy. Hereinafter, the radio communication device is described with reference to FIGS. 3 to 16, taking the radio communication devices 20 and 20' shown in FIG. 1 as an example. The hardware configuration, functions and operation of the radio communication device described hereinbelow are applicable also to each communication device of the communication system 2 shown in FIG. 2 or a communication device of another embodiment.

[2] Estimation of Distance Information Based on Radio Signal

[2-1] Hardware Configuration of Radio Communication Device

Figure 3:
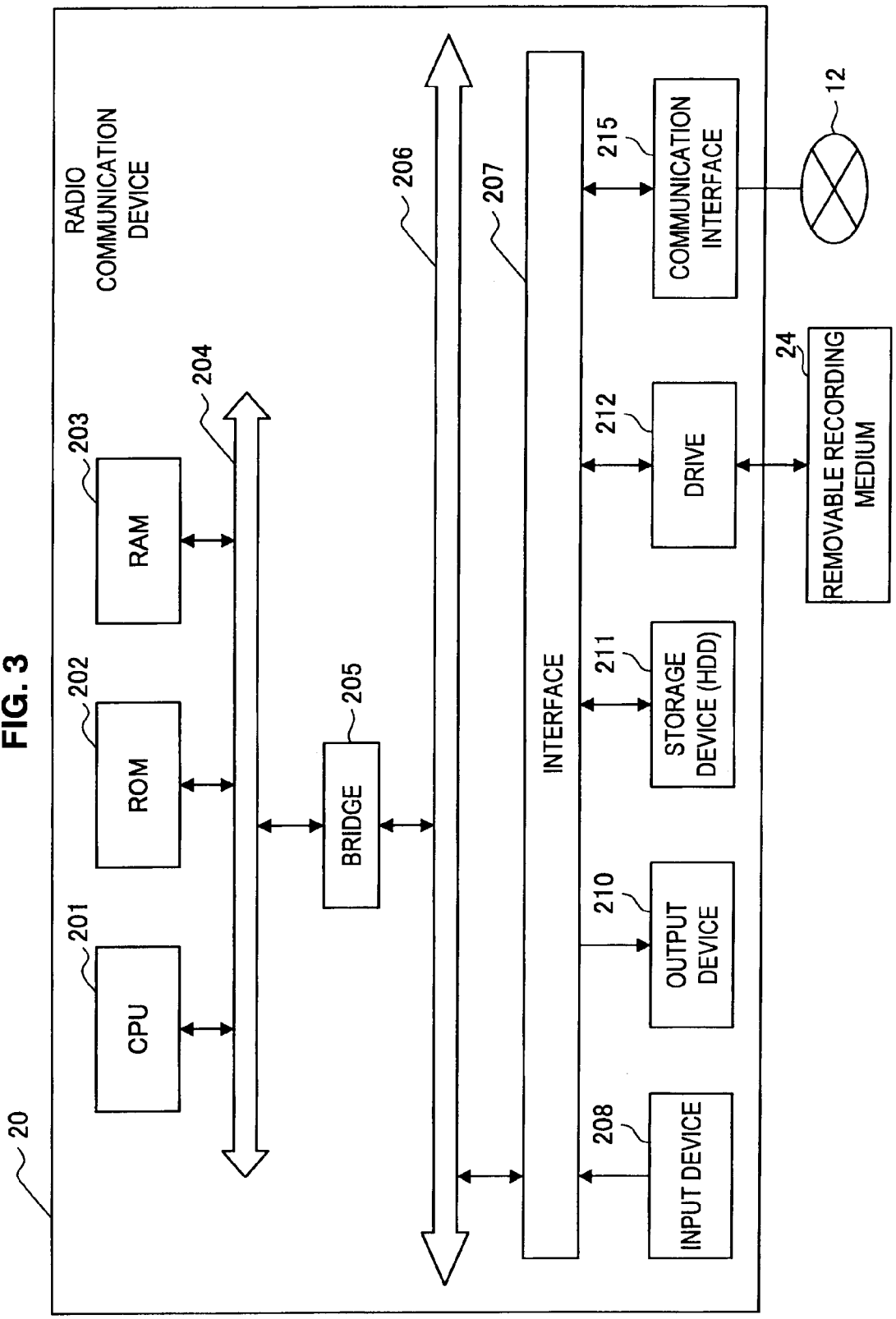
FIG. 3 is a block diagram showing an example of a hardware configuration of a radio communication device.

FIG. 3 is a block diagram showing a hardware configuration of the radio communication device 20. The radio communication device 20 includes a CPU (Central Processing Unit) 201, a ROM (Read Only Memory) 202, a RAM (Random Access Memory) 203, a host bus 204, a bridge 205, an external bus 206, an interface 207, an input device 208, an output device 210, a storage device (HDD) 211, a drive 212 and a communication interface 215.

The CPU 201 functions as an arithmetic processing device and a control device, and controls the overall operation of the radio communication device 20 according to various programs. Further, the CPU 201 can be a microprocessor. The ROM 202 stores programs, arithmetic parameters and the like which are used by the CPU 201. The RAM 203 temporarily stores programs used by the CPU 201 and parameters and the like which varies as appropriate during an implementation of the programs. These are connected to one another by the host bus 204 composed of a CPU bus and the like.

The host bus 204 is connected to the external bus 206 such as a PCI (Peripheral Component Interconnect/Interface) bus via the bridge 205. Note that the host bus 204, bridge 205 and external bus 206 do not have to be separately provided and those functions may be mounted in a single bus.

The input device 208 is composed of an input means, which is used by a user to input information, such as a mouse, a keyboard, a touch panel, a button, a microphone, a switch and a lever, and an input control circuit for generating input signals based of user's input and outputting to the CPU 201. By operating the input device 208, the user of the radio communication device 20 can input various data and instruct processing operation to the radio communication device 20.

The output device 210 is composed of a display device such as a CRT (Cathode Ray Tube) display device, a liquid crystal display (LCD) device, an OLED (Organic Light Emitting Diode) device and a lamp, and an audio output device such as a speaker and a headphone. The output device 210 outputs a reproduced content, for example. Specifically, the display device displays various information such as reproduced video data and the like in form of texts or images. On the other hand, the audio output device converts reproduced sound data and the like to sound and outputs the sound.

The storage device 211 is a data storing device composed as an example of a memory unit of the radio communication device 20. The storage device 211 may include a memory medium, a recording device for recording data to the memory medium, a readout device for reading data from the memory medium, a deletion device for deleting data recorded in the memory medium, and the like. The storage device 211 is composed of a HDD (Hard Disk Drive) for example. The storage device 211 drives a hard disk and stores programs and various data which are executed by the CPU 201. Further, in the storage device 211, later described field intensity, noise floor and the like are recorded in association with users.

The drive 212 is a reader/writer for a memory medium and internally mounted in or externally connected to the radio communication device 20. The drive 212 reads information from an attached magnetic disc, optical disc, magnetic-optical disc, or a removable recording memory 24 such as a semiconductor memory, and outputs to the RAM 203.

The communication interface 215 is a communication interface composed of a communication device for connecting to a communication network 12, for example. Further, the communication interface 215 may be a communication device for a wireless LAN, a communication device for a wireless USB, or a wired communication device for a wired communication. The communication interface 215 transmits/receives radio signals to/from other radio communication device 20'.

Here, the hardware configuration of the radio communication device 20' can substantially be the same as the hardware configuration of the above described radio communication device 20, so the detailed description will be omitted.

[2-2] Functions of Radio Communication Device

The hardware configuration of the radio communication device 20 has been described with reference to FIG. 3. Next, functions of the radio communication device 20 will be described.

Figure 4:
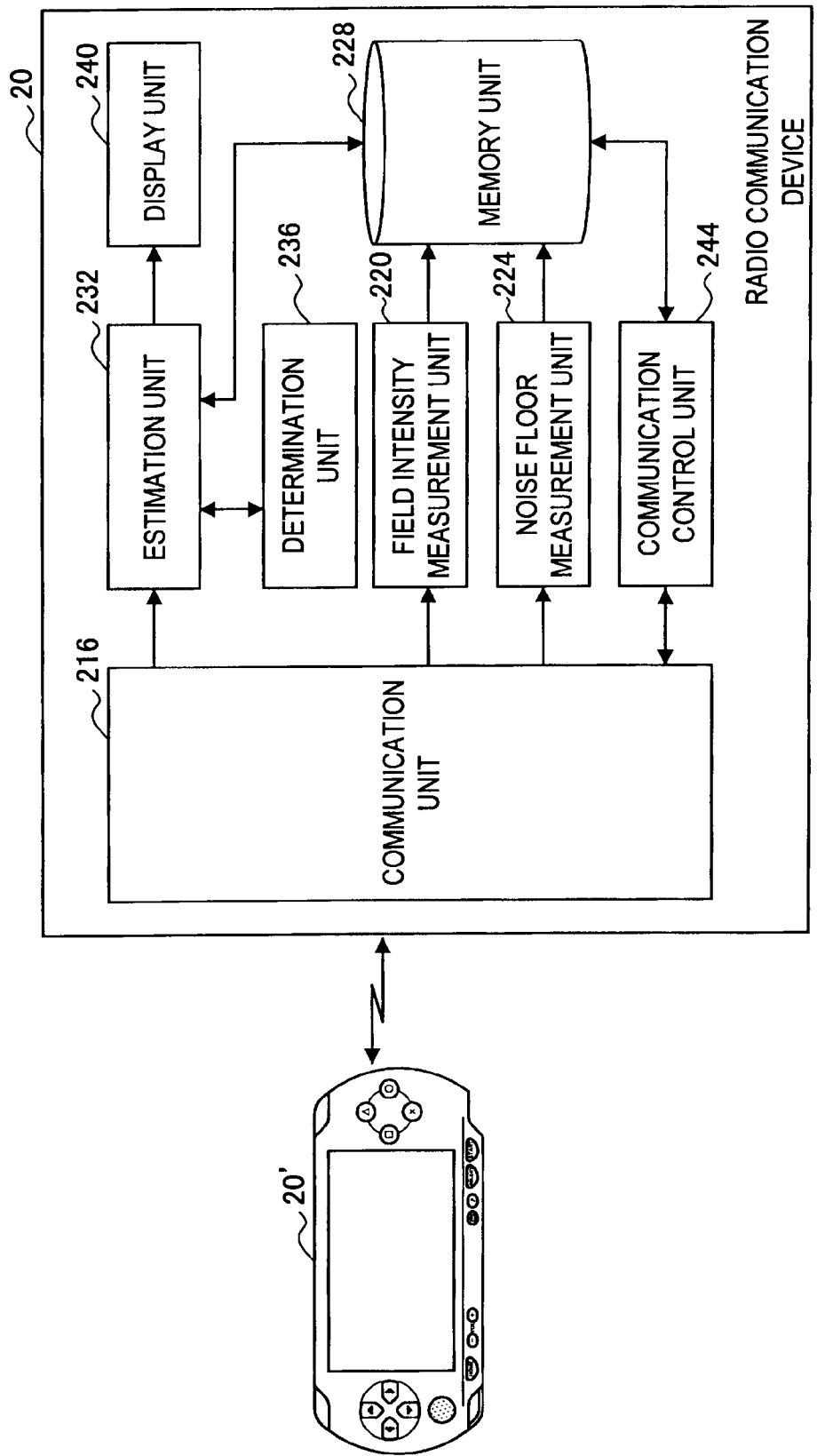
FIG. 4 is a block diagram showing an example of a functional layout for distance estimation of a radio communication device.

FIG. 4 is a functional block diagram showing the configuration of the radio communication device 20. As shown in FIG. 4, the radio communication device 20 includes a communication unit 216, a field intensity measurement unit 220, a noise floor measurement unit 224, a memory unit 228, an estimation unit 232, a determination unit 236, a display unit 240 and a communication control unit 244.

The communication unit 216 is an interface for transmitting/receiving radio signals such as a distance measurement packet or streaming data to/from other radio communication device 20' and has functions as a transmission unit and a reception unit.

The other radio communication device 20' generates a distance measurement packet and periodically transmits to the radio communication device 20. The distance measurement packet is a packet used by the radio communication device 20 to measure the distance between the radio communication device 20 and the radio communication device 20'. When there are data to be transmitted from the other radio communication device 20' to the radio communication device 20, the data can be included in the distance measurement packet. Further, the distance measurement packet has a data amount equal to or greater than 1 byte. Note that the radio communication device 20 can estimate the distance from the radio communication device 20' based on text data and streaming data without using the distance measurement packet.

Further, the communication unit 216 receives device information that indicates a transmitting power of the radio communication device 20' before receiving the distance measurement packet.

Figure 5:
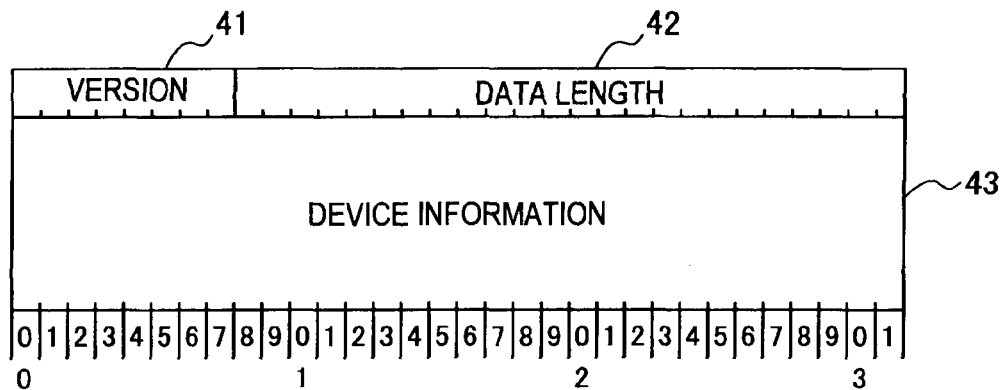
FIG. 5 is an explanatory view showing an example of a packet configuration including device information.

FIG. 5 is an explanatory view showing an example of a packet configuration including device information. This packet includes, as shown in FIG. 5, a version 41 which is 8 bytes in length and is a value of format version of the packet, a data length 42 of the packet and device information 32.

Figure 6:
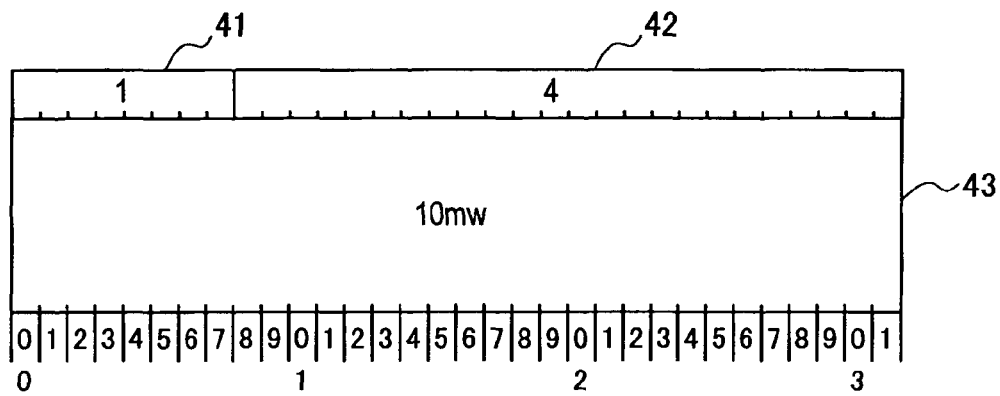
FIG. 6 is an explanatory view showing an illustrative example of a packet including device information.
Figure 7:
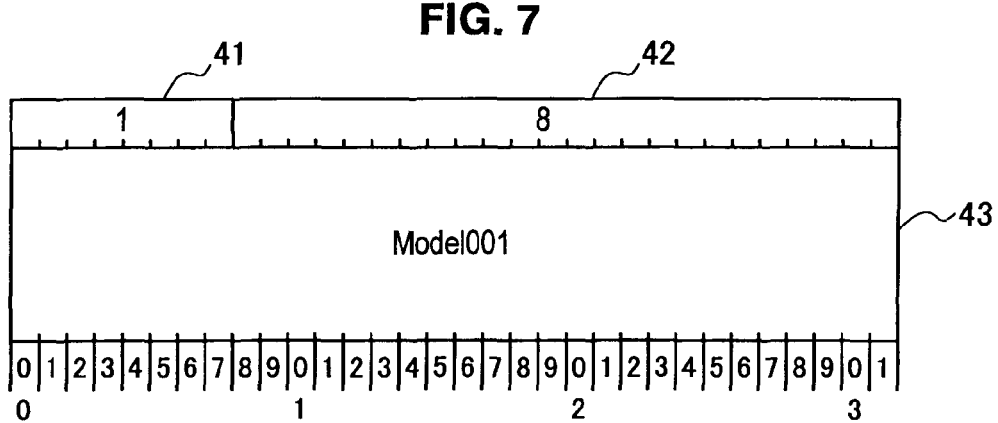
FIG. 7 is an explanatory view showing an illustrative example of a packet including device information.

FIGS. 6 and 7 are explanatory views showing illustrative examples of a packet including device information. In the example shown in FIG. 6, the version 41 is "1," the data length 42 is "4," and the device information 32 is "10 mw." The "10 mw" written as the device information 32 is a transmitting power of the radio communication device 20' upon transmitting a radio signal.

Further, in the example shown in FIG. 7, the version 41 is "1," the data length 42 is "8," and the device information 32 is "Model001." The "Model001" written as the device information 32 is an antenna type of the radio communication device 20' or radio communication device 20'. Base on the type, a transmitting power of the radio communication device 20' can be specified.

As described above, since the communication unit 216 receives device information including a transmitting power or a type of the radio communication device 20' in advance, the estimation unit 232 is allowed to estimate the distance from the radio communication device 20' according to the content of the device information. Note that the format of the packet including the device information is not limited to the example shown in FIG. 5 and any format such as a serial number of the radio communication device 20' can be used if it can be recognized between applications (programs) of the radio communication device 20 and radio communication device 20'.

The field intensity measurement unit 220 has a function as a measurement unit for measuring a field intensity (reception intensity) of the distance measurement packet received by the communication unit 216. The field intensity measurement unit 220 may obtain the field intensity from an API (Application Program Interface), a function, a driver applicable to a wireless hardware, or the like.

The noise floor measurement unit 224 measures a noise floor indicating a level of noise included in the distance measurement packet received by the communication unit 216. In general, differently from an S/N (signal-to-noise) ratio, a greater value of the noise floor indicates a worse radio wave environment (a larger noise component) and a smaller value indicates a better radio wave environment (a smaller noise component). The noise floor measurement unit 224 may obtain the noise floor from an API (Application Program Interface), a function, a driver applicable to a wireless hardware, or the like.

The memory unit 228 stores the field intensity of the distance measurement packet that is measured by the field intensity measurement unit 220 and the noise floor value of the distance measurement packet that is measured by the noise floor measurement unit 224. Further, the memory unit 228 stores the device information received by the communication unit 216 in advance in association with a later described threshold value N and threshold value F, an evaluation formula or the like.

Here, the memory unit 228 may be a memory medium of a nonvolatile memory such as an EEPROM (Electrically Erasable Programmable Read-Only Memory) and an EPROM (Erasable Programmable Read Only Memory), a magnetic disc such as a hard disk and a magnetic substance disk, an optical disc such as a CD-R (Compact Disc Recordable)/RW (ReWritable), a DVD-R (Digital Versatile Disc Recordable)/RW/+R/+RW/RAM (Ramdam Access Memory) and a BD (Blu-Ray Disc (registered trademark))-R/BD-RE, or an MO (Magneto Optical) disc.

The estimation unit 232 estimates a distance from the radio communication device 20' using the field intensity and the noise floor value, which is determined by the determination unit 236 to satisfy a predetermined condition, among the field intensities and noise floor values stored in memory unit 228. Hereinafter, a determination by the determination unit 236 will be described after a specific description of the functions of the estimation unit 232.

Firstly, the estimation unit 232 maintains a pair of a field intensity and a noise floor value which is determined by the determination unit 236 to satisfy a predetermined condition as a distance measurement database. Then, when the following condition A is satisfied, a distance measurement evaluation value is calculated.
(Condition a)
1. A set period has passed.
2. The number of pairs of the field intensity and noise floor value is increased by a fixed number.
3. The accumulated number of pairs of the field intensity and noise floor value excesses a predetermined value.
One of the above 1 to 3 or a combination.

Figures 8, 9:
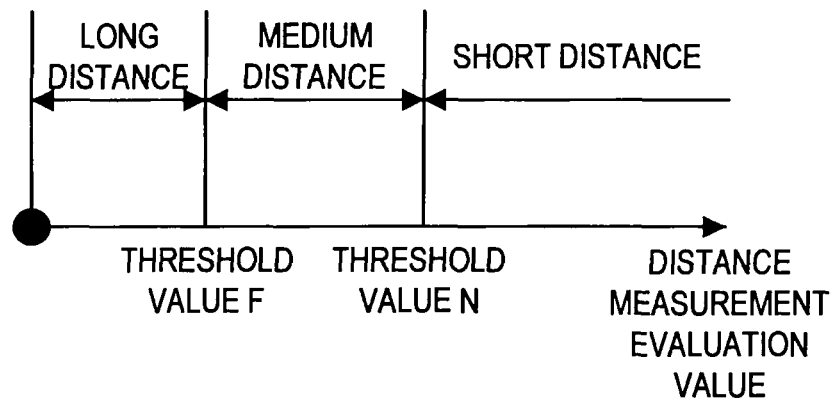
FIG. 8 is an explanatory view showing a relationship between distance measurement evaluation values and estimated distances.
FIG. 9 is an explanatory view showing an example in which device information and evaluation formulas are associated and stored in a memory unit.

Note that the distance measurement evaluation value may be an average value of field intensities in the distance measurement database or a latest field intensity. As shown in FIG. 8, for example, the estimation unit 232 estimates the distance between the radio communication devices 20 and 20' based on the magnitude of the distance measurement evaluation value.

FIG. 8 is an explanatory view showing a relationship between distance measurement evaluation values and estimated distances. As shown in FIG. 8, when the distance measurement evaluation value is smaller than the threshold value F, the estimation unit 232 estimates that the distance between the radio communication devices 20 and 20' is a long distance. Further, when the distance measurement evaluation value is greater than the threshold value N, the estimation unit 232 estimates that the distance between the radio communication devices 20 and 20' is a short distance. Further, when the distance measurement evaluation value is equal to or greater than the threshold value F or equal to or smaller than the threshold value N, the estimation unit 232 estimates that the distance between the radio communication devices 20 and 20' is a medium distance.

Note that the threshold value N and threshold value F may be stored in association with device information in the memory unit 228. In this case, the estimation unit 232 may extract the threshold value N and threshold value F from the memory unit 228, which correspond to the device information received from the radio communication device 20' in advance. It is assumed that the threshold value N and threshold value F associated with device information that indicates a relatively high transmitting power tend to be relatively great values.

Further, as a substitute for the threshold value N and threshold value F, a evaluation formula for calculating a distance measurement evaluation value may be associated with the device information and stored in the memory unit 228 as shown in FIG. 9.

FIG. 9 is an explanatory view showing an example in which device information and evaluation formulas are associated and stored in the memory unit 228. More specifically, device information "Model001" is associated with an evaluation formula 1 and device information "Model002" is associated with an evaluation formula 2. Device information "Model003" and device information "Model004" are also associated with evaluation formulas.

For example, the evaluation formula 1 may be (added value of latest three field intensities)/3, and the evaluation formula 2 may be (added value of latest three field intensities)/4.

Since each radio communication device 20' has different antenna shape, product shape, transmitting power or the like, in the radio communication device 20, it has been difficult to accurately estimate the distance between the radio communication devices 20 and 20' based on only the field intensity. Thus, when the device information is associated with a threshold value N, a threshold value F, and an evaluation formula and stored in the memory unit 228, the estimation unit 232 can perform a distance estimation for the radio communication device 20'.

The determination unit 236 determines whether the pair of the field intensity and noise floor value stored in the memory unit 228 satisfy a predetermined condition. Here, when the noise floor value is greater than an upper limit set value, it is assumed that the reception environment for receiving the distance measurement packet by the communication unit 216 is remarkably deteriorated. Further, when the noise floor value is lower than a lower limit set value, it is assumed that the reception environment for receiving the distance measurement packet by the communication unit 216 is excessively good. Thus, when the noise floor value is greater than the lower limit set value and lower than the upper limit set value, it is assumed that the reception environment for receiving the distance measurement packet by the communication unit 216 is almost in a steady state.

Thus, among the pairs of the field intensity and noise floor value, the determination unit 236 determines that a pair having a noise floor value that is equal to or greater than the lower limit set value and equal to or lower than the upper limit set value satisfies the predetermined condition and adds the pair to the distance measurement database maintained by the estimation unit 232. In other words, the determination unit 236 filters a pair of the field intensity and noise floor value that is to be used by the estimation unit 232 among the pairs of the field intensity and noise floor value stored in the memory unit 228. Note that the determination unit 236 may perform filtering when a pair of the field intensity and noise floor is recorded in the memory unit 228. A manner of filtering by the determination unit 236 will be described with reference to FIGS. 10 and 11.

FIG. 10 is an explanatory view showing an illustrative example of distances between the radio communication devices 20 and 20' and the field intensities before filtering by the judgment unit 236. More specifically, FIG. 10 shows field intensities obtained in respective distances as changing the distance between the radio communication devices 20 and 20' to a plurality of distances. As shown in FIG. 10, before filtering by the judgment unit 236, the obtained field intensity varies in a range even when the distance of the radio communication devices 20 and 20' is the same.

FIG. 11 is an explanatory view showing an illustrative example of distances between the radio communication devices 20 and 20' and the field intensities after filtering by the judgment unit 236. As shown in FIG. 11, after the filtering by the judgment unit 236, the range in which the field intensity varies is smaller while the distance between the radio communication devices 20 and 20' is the same compared to the case before the filtering by the judgment unit 236.

As described above, when the field intensity used by the estimation unit 232 is filtered by the determination unit 236 based on the noise floor value, the estimation unit 232 can estimate distance between the radio communication devices 20 and 20' based on reliable field intensities. As a result, the accuracy of distance estimation by the estimation unit 232 will be improved. Hereinafter, an illustrative example of the distance estimation by the estimation unit 232 will be described with reference to FIG. 12.

Figure 12:
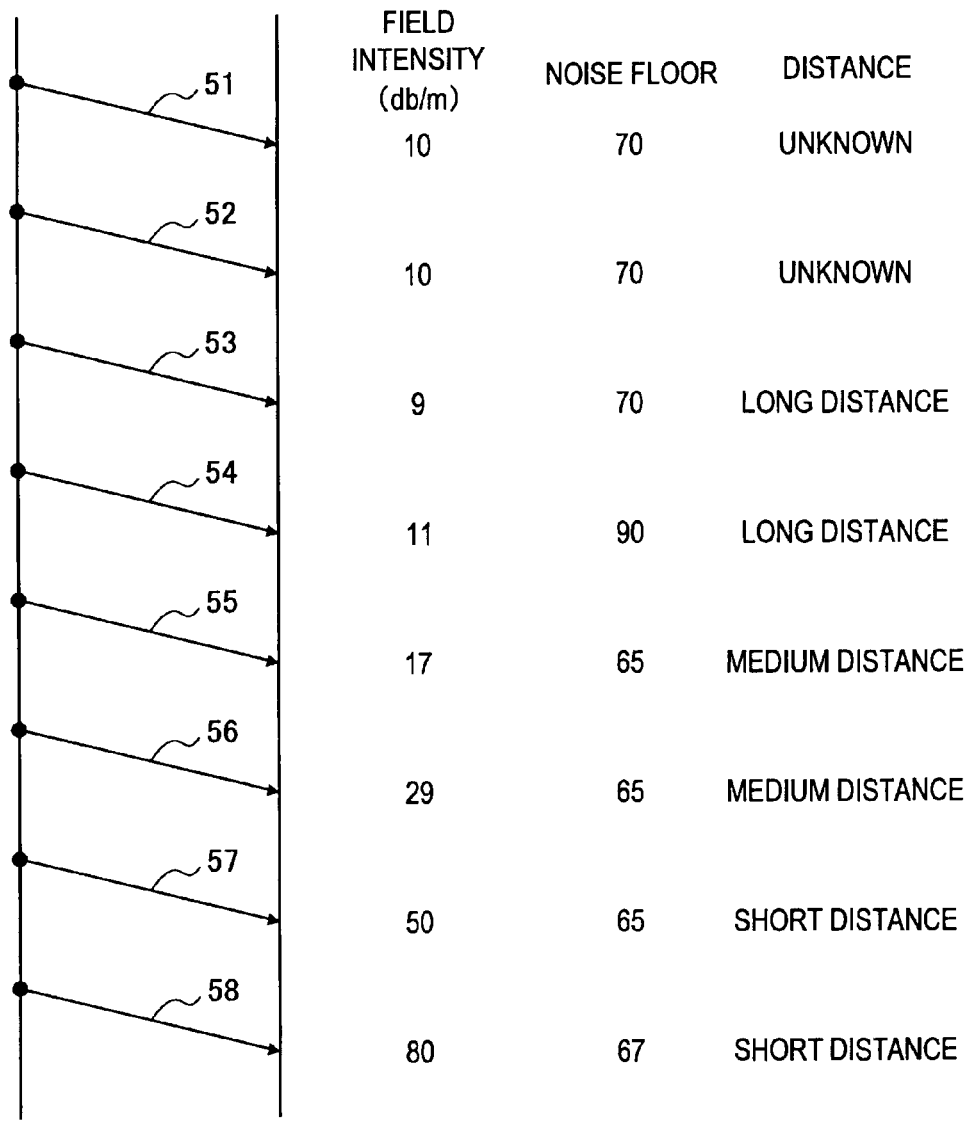
FIG. 12 is an explanatory view showing an illustrative example of a distance estimation by an estimation unit.

FIG. 12 is an explanatory view showing an illustrative example of a distance estimation by the estimation unit 232. Here, it is assumed that, in the condition A, three or more pairs of the field intensity and noise floor value are stored as the distance measurement database, and the lower limit set value is 50 and the upper limit set value is 70, which are used for filtering by the judgment unit 236. The estimation unit 232 calculates a distance measurement evaluation value by averaging the last three field intensities and sets as threshold value F=10 and threshold value N=30.

As described in FIG. 12, firstly, the radio communication device 20 receives the distance measurement packet 51. Then, the radio communication device 20 measures a field intensity of the distance measurement packet 51 as 10 db/m and a noise floor as 70. Since the noise floor of the distance measurement packet 51 satisfies the predetermined condition of the determination unit 236, the pair of the field intensity and noise floor of the distance measurement packet 51 is maintained as a distance measurement database in the estimation unit 232. However, the number of the pairs of the field intensity and noise floor maintained as the distance measurement database in the estimation unit 232 has not reached three, so the estimation unit 232 concludes that the condition A is not satisfied and the distance from the radio communication device 20' is unknown.

Next, the radio communication device 20 receives a distance measurement packet 52. Then, the radio communication device 20 measures the field intensity of the distance measurement packet 52 as 10 db/m and the noise floor as 70. Since the noise floor of the distance measurement packet 52 satisfies the predetermined condition of the determination unit 236, the pair of the field intensity and noise floor of the distance measurement packet 52 is stored as the distance measurement database in the estimation unit 232. However, the number of the pairs of the field intensity and noise floor maintained as the distance measurement database of the estimation unit 232 has not reached three, so the estimation unit 232 concludes that the condition A is not satisfied and the distance from the radio communication device 20' is unknown.

After that, the radio communication device 20 receives a distance measurement packet 53. Then, the radio communication device 20 measures the field intensity of the distance measurement packet 53 as 9 db/m and the noise floor as 70. Since the noise floor of the distance measurement packet 53 satisfies the predetermined condition of the determination unit 236, the pair of the field intensity and noise floor of the distance measurement packet 53 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates that the distance from the radio communication device 20' is a long distance.

Further, the radio communication device 20 receives a distance measurement packet 54. Then, the radio communication device 20 measures the field intensity of the distance measurement packet 54 as 11 db/m and the noise floor as 90. The noise floor of the distance measurement packet 54 does not satisfy the predetermined condition (the upper limit set value is greater than 70) of the determination unit 236, the pair of the field intensity and noise floor of the distance measurement packet 54 is not used by the estimation unit 232. However, the number of pairs of the field intensity and noise floor maintained as the distance measurement database in the estimation unit 232 has reached three, so the estimation unit 232 calculates the distance measurement evaluation value as (10+10+9)/3=9.666 . . . . Since this distance measurement evaluation value is smaller than the threshold value F, the estimation unit 232 estimates the distance from the radio communication device 20' is a long distance.

Next, the radio communication device 20 receives a distance measurement packet 55. Then, the radio communication device 20 measures the field intensity of the distance measurement packet 55 as 17 db/m and the noise floor as 65. Since the noise floor of the distance measurement packet 55 satisfies the predetermined condition of the determination unit 236, the pair of the field intensity and noise floor of the distance measurement packet 55 is maintained as the distance measurement database in the estimation unit 232. Further, the number of pairs of the field intensity and noise floor maintained as the distance measurement database of the estimation unit 232 has reached three, so the estimation unit 232 calculates the distance measurement evaluation value as (10+9+17)/3=12. Since this distance measurement evaluation value is greater than the threshold value F and smaller than the threshold value N, the estimation unit 232 estimates that the distance from the radio communication device 20' is a medium distance.

When distance measurement packets 56 to 58 are received, the estimation unit 232 operates in the same manner and estimates that the distance from the radio communication device 20' approaches to a short distance, as described below in detail. The distance from the radio communication device 20' estimated by the estimation unit 232 may be displayed on the display unit 240. Further, the distance from the radio communication device 20' estimated by the estimation unit 232 may be used in a selected application.

Here, back to the explanation of the configuration of the radio communication device 20 with reference to FIG. 4, the communication control unit 244 has a function as a control unit for controlling a distance measurement packet transmission by the communication unit 216. Hereinafter, the purpose of the provision of the communication control unit 244 and detail functions thereof will be described.

As described with reference to FIG. 12, the radio communication device 20 can estimate the distance from the radio communication device 20' by receiving a distance measurement packet from the radio communication device 20'. Further, as a manner that the radio communication device 20' estimates the distance from the radio communication device 20, a manner that a distance measurement packet is sent from the radio communication device 20 can be considered.

However, if the radio communication device 20 simply transmits a distance measurement packet every predetermined period even when the radio communication device 20' has not been in a radio wave coverage, the communication resource is used unnecessarily.

Here, when the radio communication device 20 has received a distance measurement packet from the radio communication device 20', it is likely that the radio communication device 20' is in the radio wave coverage of the radio communication device 20. On the other hand, when the radio communication device 20 cannot receive a distance measurement packet from the radio communication device 20', it is likely that the radio communication device 20' is out of the radio wave coverage of the radio communication device 20 or the packet may be lost due to a deteriorated radio wave condition.

Then, for example, the radio communication device 20' is considered as a client, the radio communication device 20 is considered as a server, and the communication control unit 244 is assumed to control to transmit a distance measurement packet to the communication unit 216 when a distance measurement packet from the radio communication device 20' is received. Here, it is assumed that the radio communication device 20' transmits a distance measurement packet every predetermined period (a period of 100 ms, for example).

With the above described configuration, since the communication control unit 244 controls the communication unit 216 to transmit a radio signal in response to a reception of a distance measurement packet, transmission of distance measurement packets which will not reach the radio communication device 20' can be prevented so that the usage of the communication resource amount can be reduced. An illustrative example of radio communication controlled by such communication control unit 244 is shown in FIG. 13.

Figure 13:
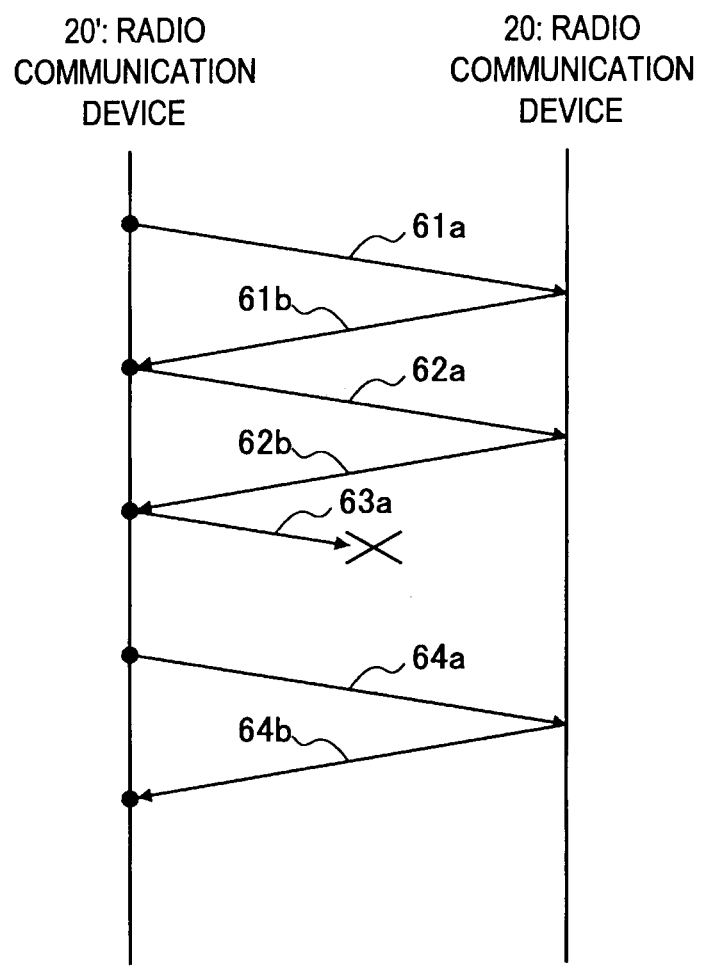
FIG. 13 is an explanatory view showing an illustrative example of radio communication controlled by a communication control unit.

FIG. 13 is an explanatory view showing the illustrative example of the radio communication controlled by the communication control unit 244. As shown in FIG. 13, the radio communication device 20' periodically transmits distance measurement packets 61*a*, 62*a*, 63*a* and 64*a*. The radio communication device 20 transmits a distance measurement packet 61*b* in response to a reception of the distance measurement packet 61*a*. Further, the radio communication device 20 transmits a distance measurement packet 62*b* in response to a reception of the distance measurement packet 62*a*.

On the other hand, since the distance measurement packet 63*a* transmitted from the radio communication device 20' does not reach the radio communication device 20, the radio communication device 20 does not transmit a distance measurement packet to respond the distance measurement packet 63*a*. After that, the radio communication device 20 transmits a distance measurement packet 64*b* in response to a reception of the distance measurement packet 64*a*. Here, the radio communication device 20 may perform transmitting the distance measurement packet and recoding the field intensity and noise floor of the received distance measurement packet to the memory unit 228, in advance or in parallel. Further, the communication control unit 244 may have a function for generating a distance measurement packet.

Here, since the radio communication device 20' can have substantially the same function as that of the radio communication device 20, explanation of detail functions of the radio communication device 20' is omitted.

[2-3] Operation of Radio Communication Device

Functions of the radio communication device 20 according to the present embodiment have been described with reference to FIGS. 3 to 13. Next, a distance estimation method executed between the radio communication device 20 and the radio communication device 20' will be described with reference to FIGS. 14 to 16.

Figure 14:
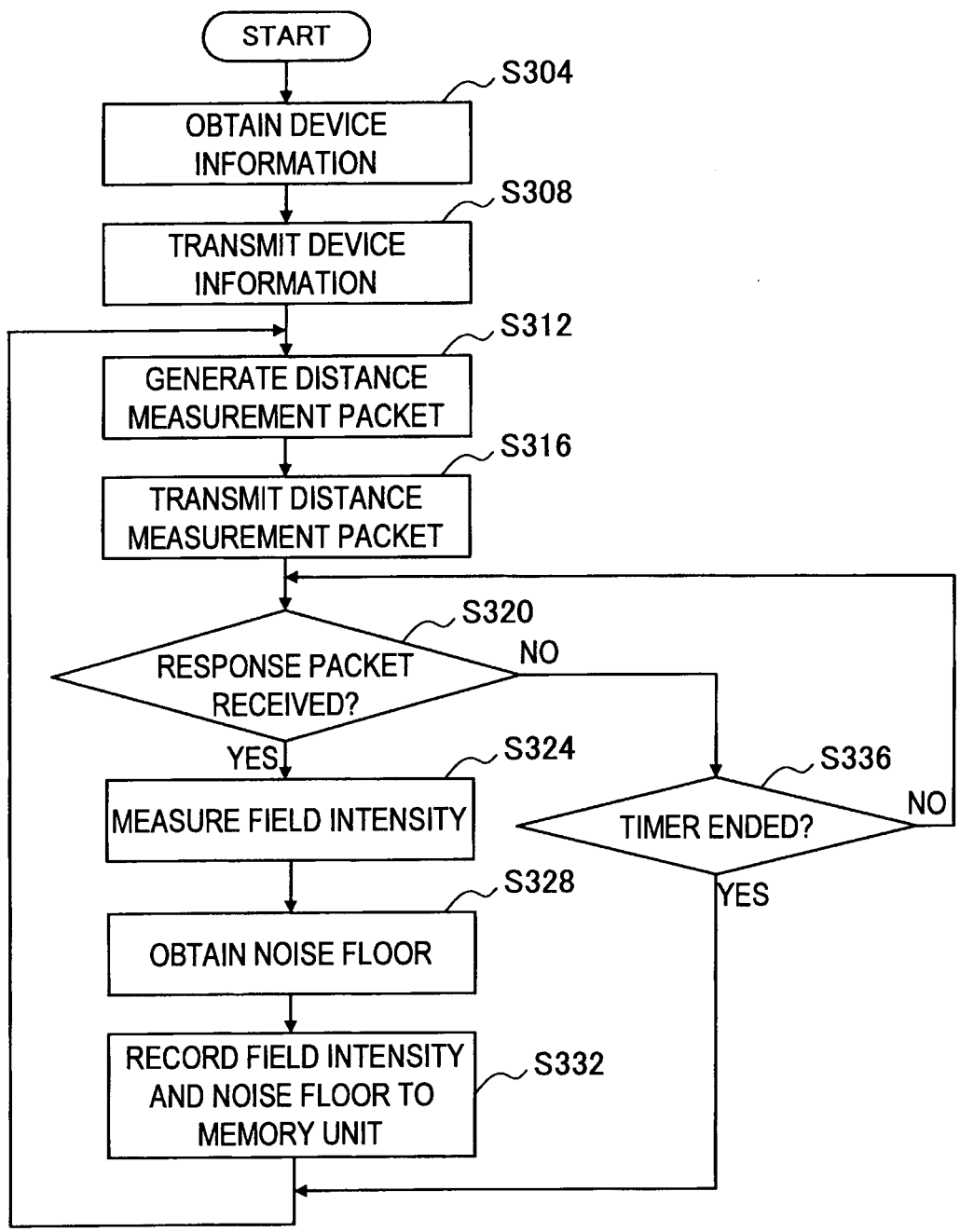
FIG. 14 is a flowchart showing an example of an operation flow of a radio communication device on the transmitting side.

FIG. 14 is a flowchart showing an operation flow of the radio communication device 20' on the transmitting side. As shown in FIG. 14, firstly, the radio communication device 20' obtains device information thereof (S304) and transmits the device information to the radio communication device 20 on the receiving side (S308).

After that, the radio communication device 20' generates a distance measurement packet (S312) and transmits the distance measurement packet to the radio communication device 20 on the receiving side (S316). Then, when the radio communication device 20' receives a distance measurement packet from the radio communication device 20 as a response to the transmitted distance measurement packet (S320), the radio communication device 20' measures a field intensity of the received distance measurement packet (S324). Further, the radio communication device 20' obtains a noise floor of the received distance measurement packet (S328). Then, the radio communication device 20' records the field intensity and noise floor to a memory unit (corresponding to the memory unit 228 in FIG. 4) (S332).

Further, when the distance measurement packet is transmitted to the radio communication device 20 on the receiving side (S316) but a distance measurement packet is not received as a response from the radio communication device 20 (S320), the radio communication device 20' determines whether a timer has ended (S336). When the time has ended, the radio communication device 20' repeats the process from S312 and, when the time has not ended, the radio communication device 20' repeats the process from S320.

Figure 15:
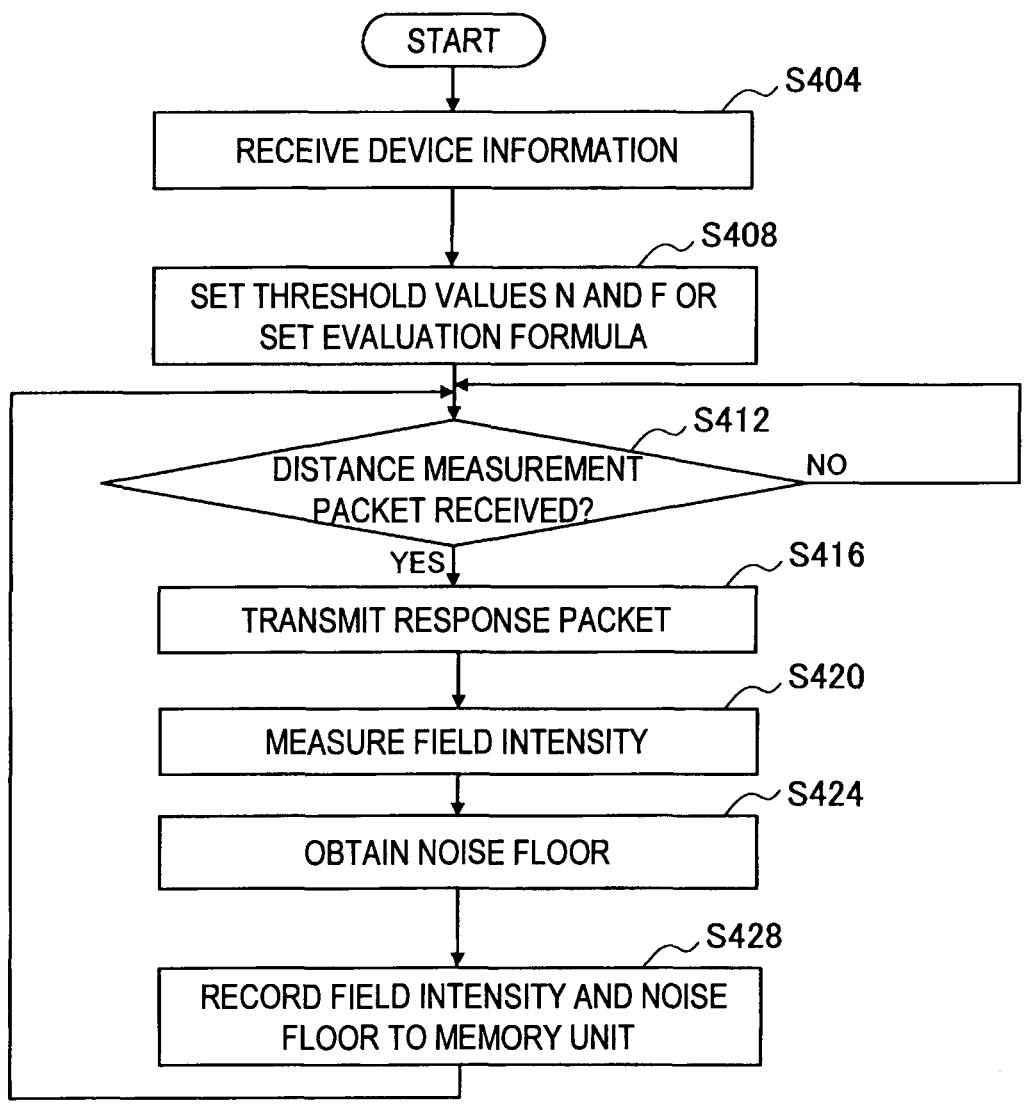
FIG. 15 is a flowchart showing an example of an operation flow of a radio communication device on the receiving side.
Figure 16:
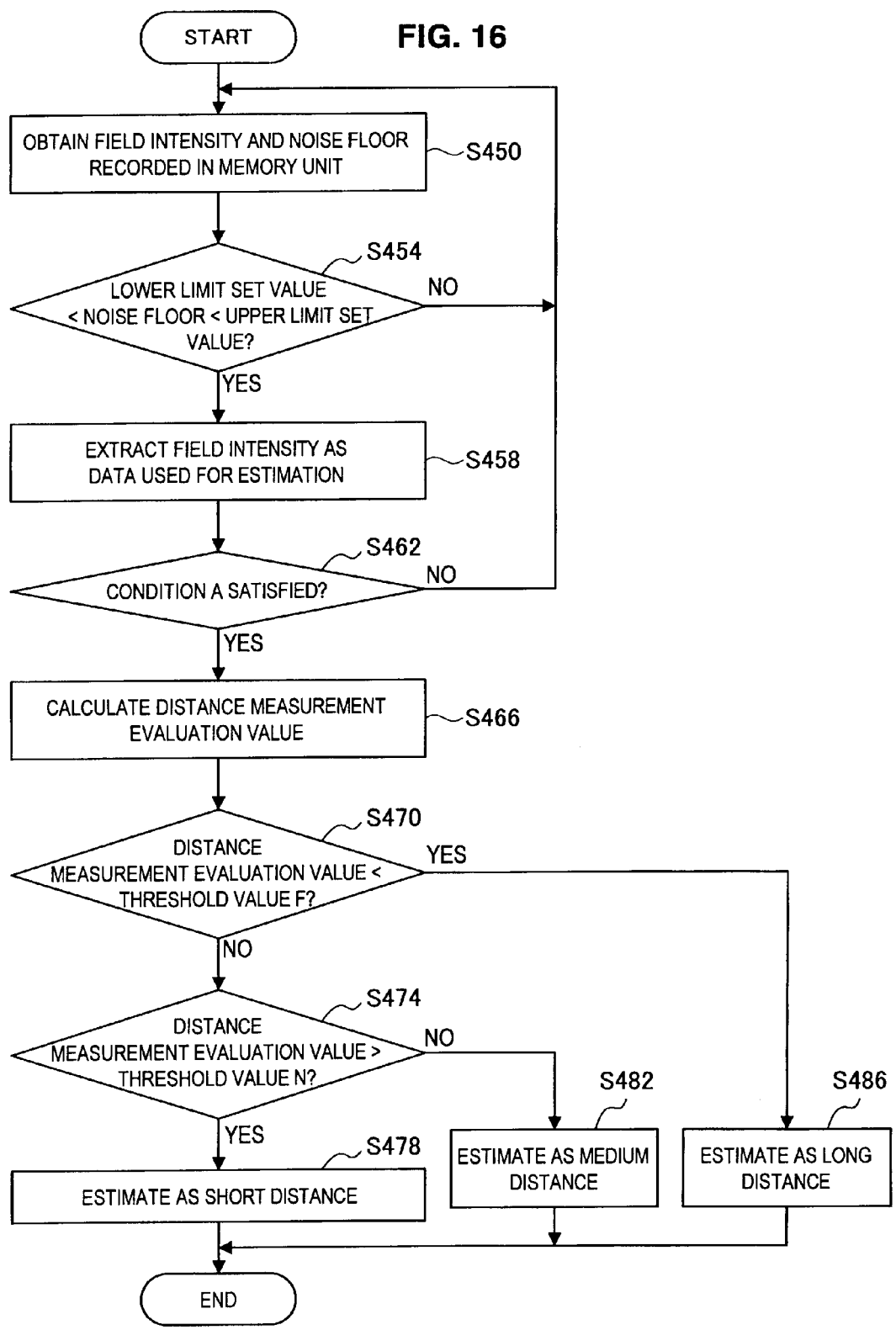
FIG. 16 is a flowchart showing an example of an operation flow of a radio communication device on the receiving side.

FIGS. 15 and 16 are flowcharts showing operation flows of the radio communication device 20 on the receiving side. As shown in FIG. 15, firstly, the radio communication device 20 receives device information of the radio communication device 20' from the radio communication device 20' (S404). Then, the estimation unit 232 sets threshold values N and F or an evaluation formula to threshold values N and F or an evaluation formula associated with the received device information and stored in the memory unit 228 (S408).

Then, when a distance measurement packet is received from the radio communication device 20' (S412), in the radio communication device 20, the communication control unit 244 controls the communication unit 216 to transmit a distance measurement packet as a response packet (S416). Further, the field intensity measurement unit 220 measures a field intensity of the received distance measurement packet (S420) and the noise floor measurement unit 224 obtains a noise floor of the received distance measurement packet (S424). Then, the field intensity and noise floor are recorded in the memory unit 228 (S428).

After that, as shown in FIG. 16, the estimation unit 232 obtains the pairs of the field intensity and noise floor stored in the memory unit 228 (S450). Next, the determination unit 236 determines whether the noise floor value included in the respective pairs of the field intensity and noise floor is greater than the lower limit set value and smaller than the upper limit set value (S454). Then, the determination unit 236 extracts a field intensity of the pair of the noise floor, which is determines to be smaller than the upper limit set value, as data to be used by the estimation unit 232, and controls the estimation unit 232 to maintain the data as distance measurement database (S458).

Further, the estimation unit 232 determines whether the above condition A is satisfied and, when the condition A is satisfied, calculates a distance measurement evaluation value according to the distance measurement database and a previously set evaluation formula (S466). Then, when the distance measurement evaluation value is smaller than the threshold value F (S470), the estimation unit 232 estimates that the distance relation with the radio communication device 20' is a long distance (S486).

On the other hand, when the distance measurement evaluation value is greater than the threshold value F (S470) and smaller than the threshold value N (S474), the estimation unit 232 estimates that the distance relationship with the radio communication device 20' is a medium distance (S482). Further, when the distance measurement evaluation value is greater than the threshold value F (S470) and greater than threshold value N (S474), the estimation unit 232 estimates that the distance relationship with the radio communication device 20' is a short distance (S478).

As one example described above, the determination unit 236 determines whether the pair of the field intensity and noise floor value stored in the memory unit 228 satisfy a predetermined condition. Here, when the noise floor value is greater than an upper limit set value, it is assumed that the reception environment for receiving the distance measurement packet by the communication unit 216 is remarkably deteriorated. Further, when the noise floor value is lower than a lower limit set value, it is assumed that the reception environment for receiving the distance measurement packet by the communication unit 216 is excessively good. Thus, when the noise floor value is greater than the lower limit set value and lower than the upper limit set value, it is assumed that the reception environment for receiving the distance measurement packet by the communication unit 216 is almost in a steady state.

Thus, the determination unit 236 determines that the predetermined condition is satisfied when the noise floor value is greater than the lower limit set value and lower than the upper limit set value as described above, so that the estimation unit 232 can estimate a distance from the radio communication device 20' based on the field intensity that is assumed to be almost in a steady state. Consequently, the radio communication device 20 can estimate the distance from the radio communication device 20' with higher accuracy in real time.

Further, since the communication control unit 244 controls the communication unit 216 to transmit a radio signal in response to a reception of a distance measurement packet, transmission of distance measurement packets which will not reach the radio communication device 20' can be prevented so that the usage of the communication resource amount can be reduced.

Hereinafter, four embodiments for appropriately selecting data to be transmitted/received according to the distance information estimated based on a radio signal in accordance with the above description are described with reference to FIGS. 17 to 26.

[3] Data Selection Based on Distance Information

[3-1] First Embodiment

A first embodiment is described firstly. The communication system 1 according to the first embodiment is composed of the radio communication devices 20 and 20' as shown in FIG. 1. In this embodiment, the radio communication device 20 that has received a radio signal from the radio communication device 20' estimates distance information on a distance from the radio communication device 20', and the radio communication device 20 selects data based on the distance information.

Figure 17:
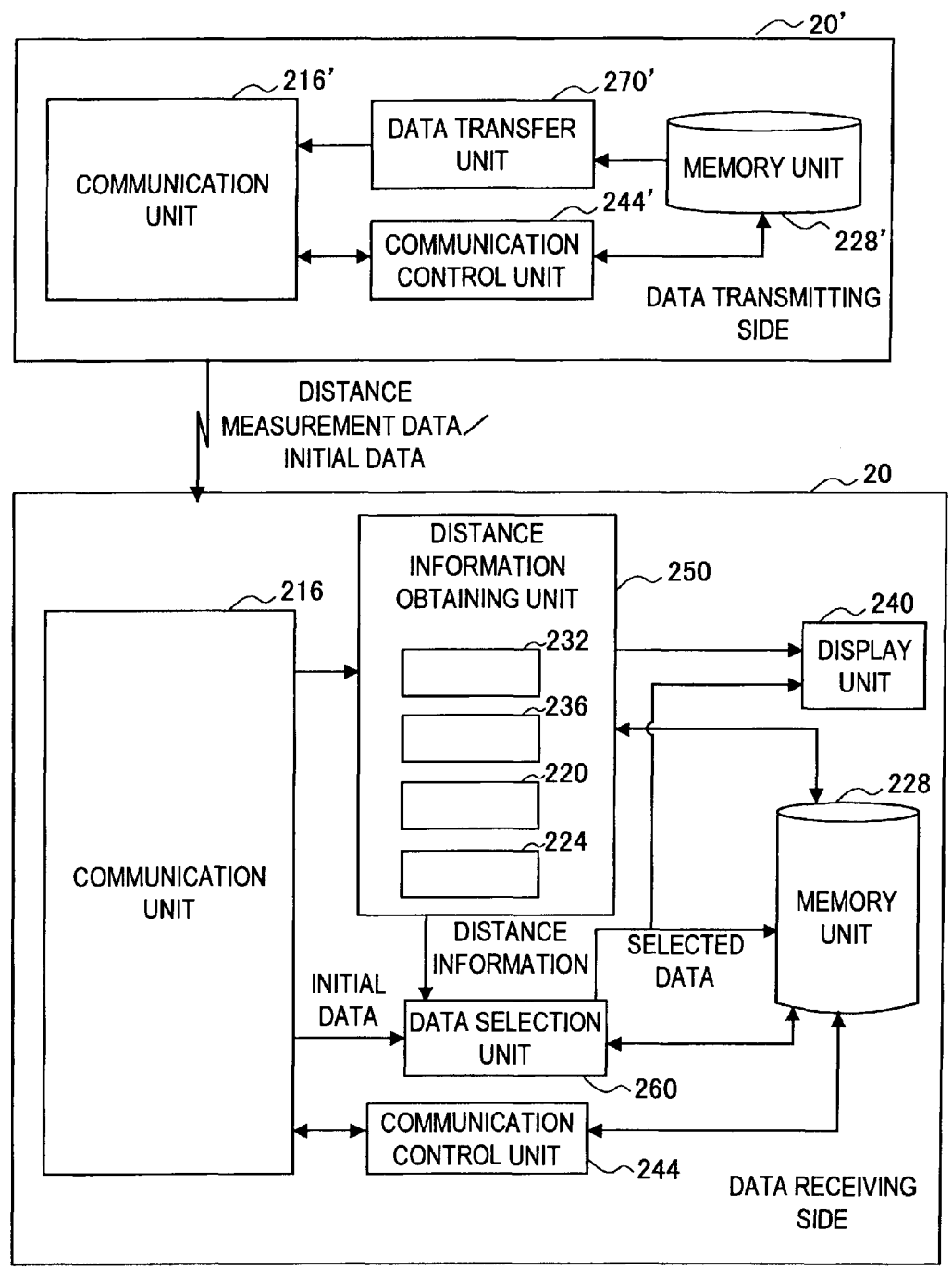
FIG. 17 is a block diagram showing an example of a functional layout for data selection according to a first embodiment.

FIG. 17 is a functional block diagram showing a logical functional layout of the radio communication devices 20 and 20' according to the embodiment. As shown in FIG. 17, the radio communication device 20 includes a communication unit 216, a memory unit 228, a display unit 240, a communication control unit 244, a distance information obtaining unit 250, and a data selection unit 260.

The communication unit 216 is an interface for transmitting/receiving radio signals such as distance measurement packets or data to/from the radio communication device 20' and has functions as a transmission unit and a reception unit.

The memory unit 228 stores field intensities for distance estimation, noise floor values, device information associated with a threshold value, an evaluation formula or the like and so on described with reference to FIG. 12, and further stores a plurality of data to be selected by the data selection unit 260 based on distance information. The memory unit 228 may store a plurality of data to be selected based on distance information by associating an attribute of each data and distance information. Further, the memory unit 228 may store data to be selected according to distance information with respect to each initial data that is used as input information for data selection. Examples of data storage in the memory unit 228 are described in detail later with reference to FIGS. 18 and 25.

The display unit 240 displays the distance information obtained by the distance information obtaining unit 250, the data selected by the data selection unit 260 or the like on the output unit 210.

The communication control unit 244 has a function as a control unit that controls transmission/reception of distance measurement packets by the communication unit 216 as described earlier.

In this embodiment, the distance information obtaining unit 250 includes a field intensity measurement unit 220, a noise floor measurement unit 224, an estimation unit 232 and a determination unit 236, and estimates and obtains distance information on the distance from the radio communication device 20' based on a radio signal by using the process described with reference to FIGS. 3 to 16. Note that the field intensity measurement unit 220, the noise floor measurement unit 224, the estimation unit 232 and the determination unit 236 and the other elements are respectively connected as shown in FIG. 4; however, the illustration of such a connection relationship is omitted in FIG. 17 in terms of clarifying the drawing.

The data selection unit 260 selects data from a plurality of data stored in the memory unit 228 based on the distance information obtained by the distance information obtaining unit 250. The data selection processing in the data selection unit 260 is described in detail later.

On the other hand, the radio communication device 20' includes a communication unit 216', a memory unit 228', a communication control unit 244' and a data transfer unit 270'.

The communication unit 216' and the communication control unit 244' have the similar functions to those of the communication unit 216 and the communication control unit 244 described above. The memory unit 228' stores initial data to be used as input information when the data selection unit 260 of the radio communication device 20 selects data, for example. The data transfer unit 270' obtains the above-described initial data from the memory unit 228' and transfers it to the radio communication device 20 through the communication unit 216', for example.

FIG. 18 shows the way that the memory unit 228 of the radio communication device 20 stores a plurality of data. Referring to FIG. 18, the memory unit 228 stores identifiers (character strings of "ITXX"; XX is numerals) for identifying items to be used in a game in two-dimensional tabular form. In the left end column of the tabular form, initial data to be used as input information for data selection is stored. In the second, third and fourth columns from the left, data associated with categories of long distance, medium distance and short distance as distance information are stored.

Specifically, in FIG. 18, for initial data "IT01", item identifier "IT01" is stored in the category of long distance, "IT11" is stored in the category of medium distance, and "IT21" is stored in the category of short distance. Further, for initial data "IT02", item identifier "IT02" is stored in the category of long distance, "IT12" is stored in the category of medium distance, and "IT22" is stored in the category of short distance. For initial data "IT03", item identifier "IT03" is stored in the category of long distance, "IT13" is stored in the category of medium distance, and "IT23" is stored in the category of short distance.

Each item identifier stored in the respective categories of distance is followed by a character in parentheses which indicates an attribute value of an item for convenience of description. For example, in the case where an item identifier indicates a weapon item used in a game, the offensive power of the weapon item can serve as the attribute of the item. In FIG. 18, the attribute values are categorized into three ranges of "high", "medium" and "low", taking the offensive power as an example of the attribute of an item.

With use of the form of storing data as shown in FIG. 18, when passing a weapon item with the initial data "IT01" between radio communication devices, for example, if the distance between the devices is a long distance, the weapon item "IT01" with a low offensive power can be selected. On the other hand, the weapon item "IT11" with a medium offensive power can be selected if the distance between the devices is a medium distance, and the weapon item "IT21" with a high offensive power can be selected if the distance between the devices is a short distance.

By storing the attribute of each data and the distance information in association with each other, it is possible to appropriately select data to be passed according to the distance information between radio communication devices. Further, when the distance information indicates a relatively long distance, data containing the attribute value included in the first range (e.g. a low offensive power) may be selected, and when it indicates a relatively short distance, data containing the attribute value included in the second range (e.g. a high offensive power) may be selected. In such a case, data with a different attribute value is selected according to the closeness between users, for example, and a game with more entertainment can be provided.

As described later in relation to the fourth embodiment, if selected data can be determined based only on the distance information, the memory unit 228 does not have to store the initial data. Further, the initial data may be data selected when the distance information is not obtained for some reason, for example.

The data stored in the memory unit 228 is not limited to the identifiers of items as shown in FIG. 18. For example, URL (Uniform Resource Locator) indicating a storage location of data may be stored in the memory unit 228. Further, the distance information associated with a plurality of data is not necessarily categorized into the three levels of distance as shown in FIG. 18. For example, two or four or more levels of categories of distance may be used. Alternatively, instead of the categories of distance, information derived from the estimated distance information by a given calculation formula, information related to a change over time of the distance information or the like may be associated with a plurality of data.

Figure 19:
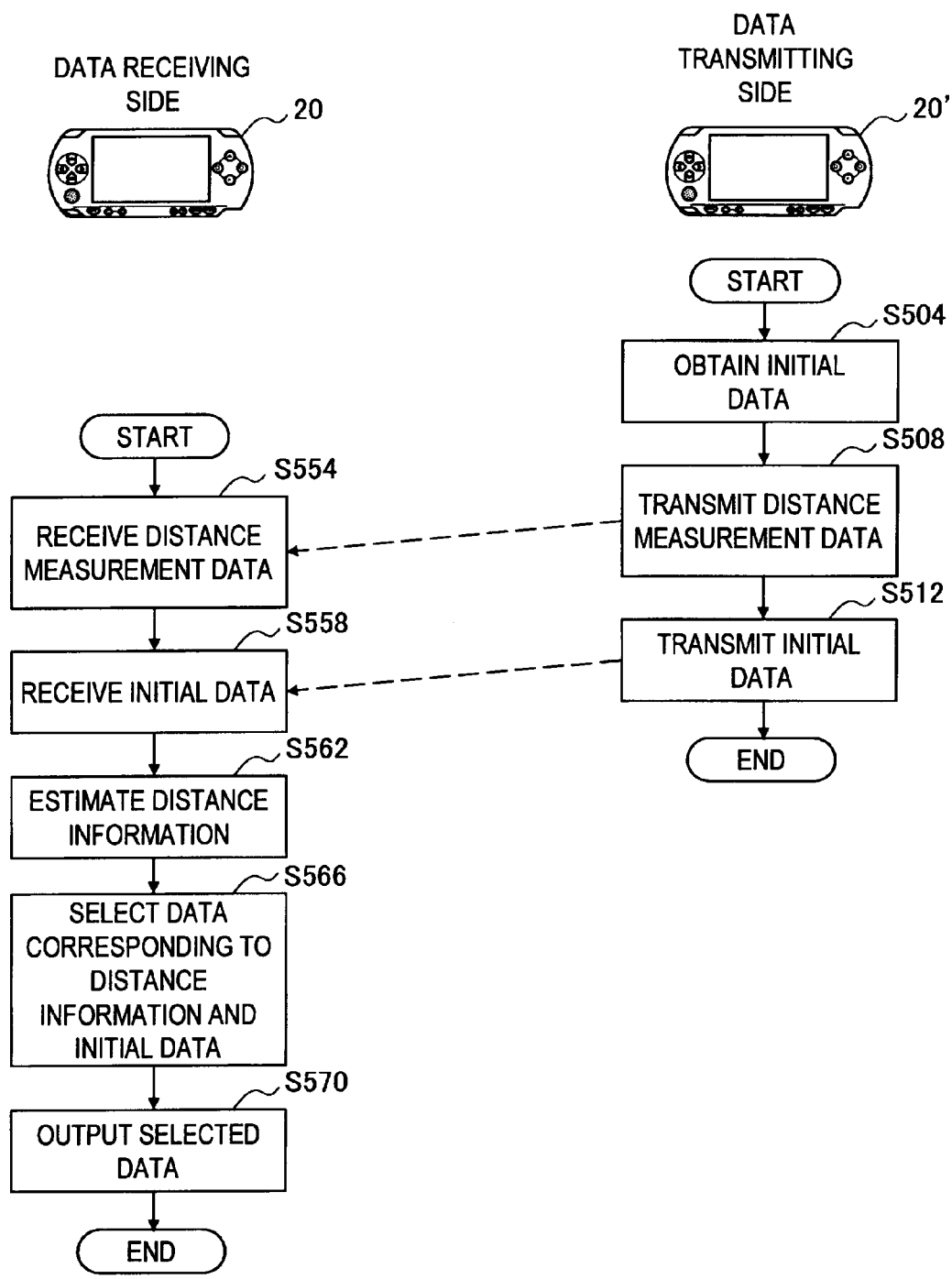
FIG. 19 is a flowchart showing an example of an operation flow related to data selection.

FIG. 19 is a flowchart showing an operation flow of the radio communication device 20' on the data transmitting side and the radio communication device 20 on the data receiving side in this embodiment.

As shown in FIG. 19, the data transfer unit 270' of the radio communication device 20' obtains the initial data stored in the memory unit 228' of its own device (S504). The initial data obtaining processing by the data transfer unit 270' can be started, triggered by an operation by a user of the radio communication device 20', a reception of a given signal from the radio communication device 20 or the like, for example.

Next, the communication control unit 244' of the radio communication device 20' transmits distance measurement data to the radio communication device 20 (S508). The distance measurement data is data to be used in the distance estimation method described in the above section and typically corresponds to the above-described distance measurement packet. Further, the distance measurement data may contain device information of a transmission source of a radio signal or the like, for example. The distance measurement data transmission processing corresponds to the process from obtaining the device information (S304) to transmitting the distance measurement packet (S316) which is described in detail with reference to FIG. 14. Description of the distance measurement data transmission processing is thus omitted. Further, the data transfer unit 270' of the radio communication device 20' transmits the initial data obtained in S504 to the radio communication device 20 (S512). In the process on the data transmitting side, obtaining the initial data (S504) may be performed after transmitting the distance measurement data (S508). Further, transmitting the initial data (S512) may be performed before transmitting the distance measurement data (S508), or the initial data may be contained in the distance measurement packet and transmitted at the same time in the process of transmitting the distance measurement data.

As shown in FIG. 19, the distance measurement data transmitted from the radio communication device 20' is received by the radio communication device 20 (S554). The distance measurement data reception processing (S554) in the radio communication device 20 corresponds to the process from receiving the device information (S404) to recording the field intensity and the noise floor (S428) which is described in detail with reference to FIG. 15. Description of the distance measurement data reception processing is thus omitted. Further, the initial data transmitted from the radio communication device 20' is received by the communication unit 216 of the radio communication device 20 and passed to the data selection unit 260 (S558).

After that, the distance information obtaining unit 250 of the radio communication device 20 estimates and obtains distance information on the distance from the radio communication device 20' by using the distance measurement data, i.e., the distance measurement packet, the device information or the like received from the radio communication device 20' (S562). The distance information estimation processing (S562) in the distance information obtaining unit of the radio communication device 20 corresponds to the process from obtaining the field intensity and the noise floor (S450) to estimating the distance (S486) which is described in detail with reference to FIG. 16. Description of the distance information estimation processing is thus omitted. The distance information estimated in the distance information obtaining unit 250 is passed to the data selection unit 260. In the process on the data receiving side, receiving the distance measurement data (S554) may be performed after receiving the initial data (S558). Further, receiving the initial data (S558) may be performed after estimating the distance information (S562).

After the initial data is received (S558) and the distance information is obtained (S562), the data selection unit 260 selects data corresponding to the passed distance information and initial data from a plurality of data stored in the memory unit 228 (S566). In the case where the data is stored in the memory unit 228 as shown in FIG. 18, for example, if the initial data is "IT01" and the distance between the radio communication device 20 and the radio communication device 20' is estimated to be a short distance, the data selection unit 260 selects "IT21".

The data selected by the data selection unit 260 based on the distance information and the initial data is output as selected data to the display unit 240 or stored in the memory unit 228 (S570).

As described above, in the first embodiment, the radio communication device 20 that receives data includes the distance information obtaining unit 250. The distance information obtaining unit 250 estimates and obtains the distance information based on the field intensity of a radio signal that is determined to satisfy a predetermined condition about a noise component among radio signals received from the radio communication device 20'. Further, a plurality of data are stored in association with distance information in the memory unit 228 of the radio communication device 20. The radio communication device 20 can thereby appropriately select data from the plurality of data stored in association with distance information by using the estimated distance information on the distance from the radio communication device 20'.

In the case where the memory unit 228 of the radio communication device 20 stores a plurality of data in association with distance information with respect to each initial data, the data selection unit 260 can appropriately select data based on the initial data received from the radio communication device 20' and the distance information.

[3-2] Second Embodiment

A second embodiment is described hereinafter. The communication system 1 according to the second embodiment is composed of the radio communication devices 20 and 20' as shown in FIG. 1, as in the first embodiment. In this embodiment, the radio communication device 20 that has received a radio signal from the radio communication device 20' estimates a distance from the radio communication device 20', and the radio communication device 20 selects data based on the distance information and further transmits the selected data to the radio communication device 20'.

Figure 20:
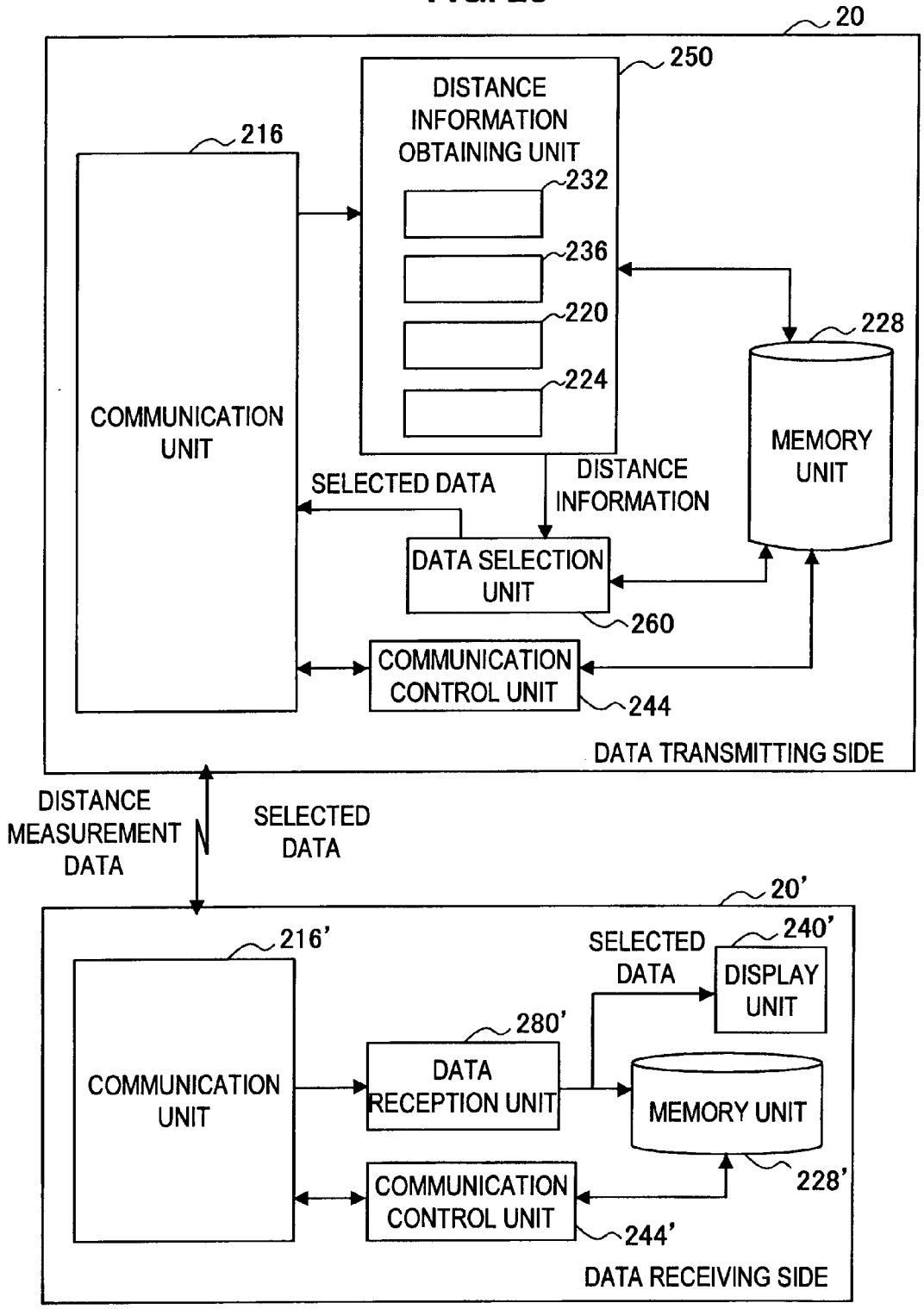
FIG. 20 is a block diagram showing an example of a functional layout for data selection according to a second embodiment.

FIG. 20 is a functional block diagram showing a logical functional layout of the radio communication devices 20 and 20' according to the embodiment. As shown in FIG. 20, the radio communication device 20 includes a communication unit 216, a memory unit 228, a communication control unit 244, a distance information obtaining unit 250, and a data selection unit 260.

The communication unit 216 and the communication control unit 244 have the same functions as those described in the first embodiment. The memory unit 228 stores the field intensity for distance estimation, the noise floor value, the device information associated with a threshold value, an evaluation formula or the like as described above, and further stores a plurality of data to be selected based on distance information and initial data to be used for data selection according to need.

In this embodiment, the distance information obtaining unit 250 includes a field intensity measurement unit 220, a noise floor measurement unit 224, an estimation unit 232 and a determination unit 236, and estimates and obtains distance information on the distance from the radio communication device 20' based on a radio signal by using the process described with reference to FIGS. 3 to 16. Note that the field intensity measurement unit 220, the noise floor measurement unit 224, the estimation unit 232 and the determination unit 236 and the other elements are respectively connected as shown in FIG. 4; however, the illustration of such a connection relationship is omitted in FIG. 20 in terms of clarifying the drawing.

The data selection unit 260 selects data from a plurality of data stored in the memory unit 228 based on the distance information obtained by the distance information obtaining unit 250.

On the other hand, the radio communication device 20' includes a communication unit 216', a memory unit 228', a display unit 240', a communication control unit 244' and a data reception unit 280' as shown in FIG. 20.

The memory unit 228' of the radio communication device 20' stores selected data received from the radio communication device 20, for example. The data reception unit 280' receives the above-described selected data from the radio communication device 20 through the communication unit 216', for example, and outputs it to the display unit 240' or the memory unit 228'. The other elements of the radio communication device 20' have the same functions as those described in the first embodiment.

Figure 21:
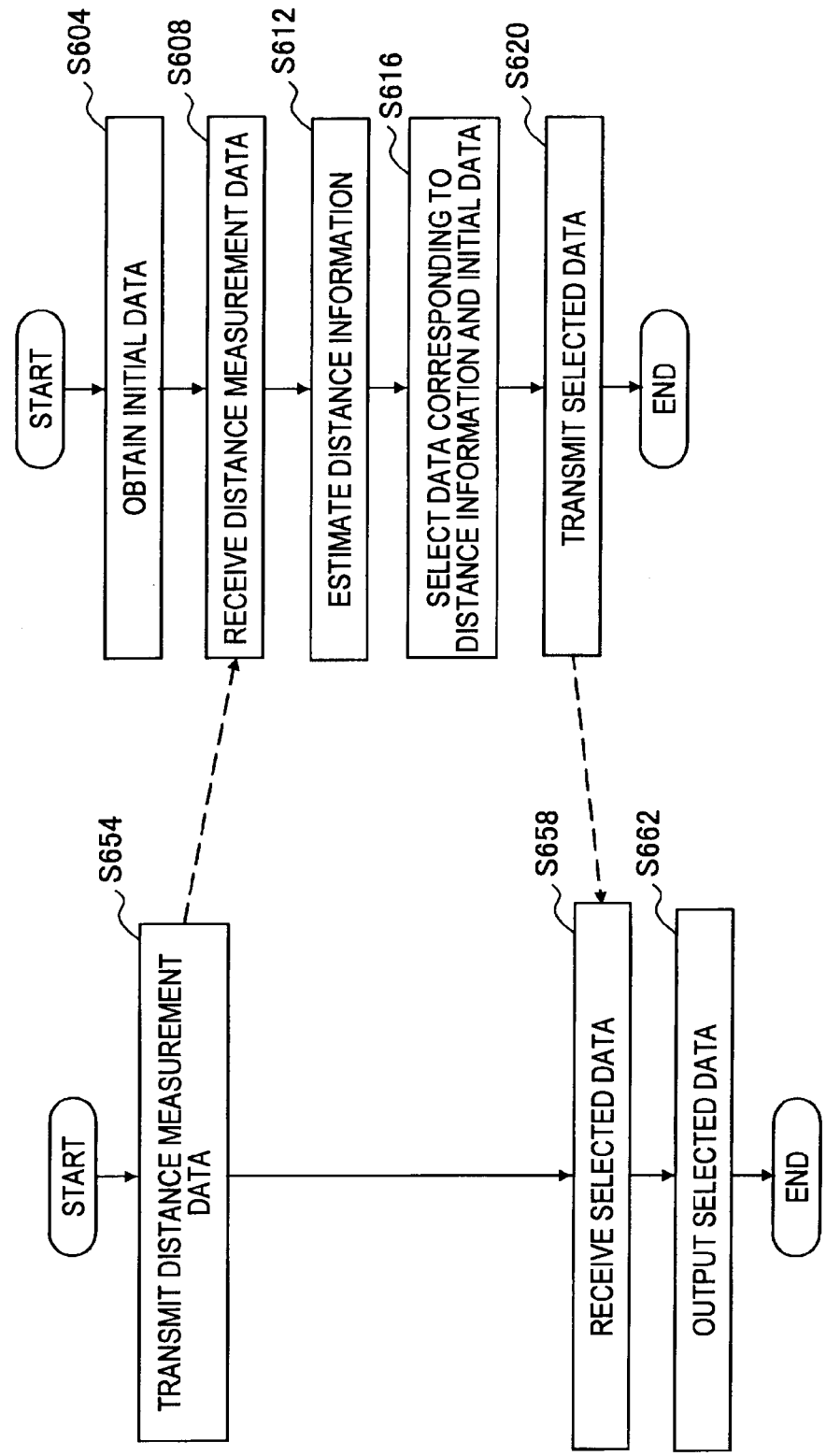
FIG. 21 is a flowchart showing an example of an operation flow related to data selection.

FIG. 21 is a flowchart showing an operation flow of the radio communication device 20 on the data transmitting side and the radio communication device 20' on the data receiving side in this embodiment.

As shown in FIG. 21, the communication control unit 244' of the radio communication device 20' transmits distance measurement data to the radio communication device 20 (S654). The distance measurement data transmission processing corresponds to the process from obtaining the device information (S304) to transmitting the distance measurement packet (S316) which is described in detail with reference to FIG. 14, as in the first embodiment.

In the radio communication device 20, the data selection unit 260 first obtains initial data by reading the initial data prestored in the memory unit 228, for example (S604). Further, the distance measurement data transmitted from the radio communication device 20' is received by the communication unit 216 of the radio communication device 20

(S608). The distance measurement data receiving processing corresponds to the process from receiving the device information (S404) to recording the field intensity and the noise floor (S428) which is described in detail with reference to FIG. 15. Acquiring the initial data (S604) may be performed at the same time as or after receiving the distance measurement data (S608).

After that, the distance information obtaining unit 250 of the radio communication device 20 estimates and obtains distance information on the distance from the radio communication device 20' by using the distance measurement data, i.e., the distance measurement packet, the device information or the like received from the radio communication device 20' (S612). The distance information estimation processing in the distance information obtaining unit 250 of the radio communication device 20 corresponds to the process from obtaining the field intensity and the noise floor (S450) to estimating the distance (S486) which is described in detail with reference to FIG. 16. The distance information estimated in the distance information obtaining unit 250 is passed to the data selection unit 260.

After the initial data is received (S604) and the distance information is obtained (S612), the data selection unit 260 selects data corresponding to the passed distance information and initial data from a plurality of data stored in the memory unit 228 (S616).

The data selected by the data selection unit 260 based on the distance information and the initial data is transmitted from the communication unit 216 to the radio communication device 20' (S620). After that, the selected data is received by the data reception unit 280' through the communication unit 216' of the radio communication device 20' (S658). Then, the selected data is output from the data reception unit 280' to the display unit 240' or the memory unit 228' (S662).

As described above, in the second embodiment, the radio communication device 20 on the data transmitting side includes the distance information obtaining unit 250. The distance information obtaining unit 250 estimates and obtains distance information based on the field intensity of a radio signal that is determined to satisfy a predetermined condition about a noise component among radio signals received from the radio communication device 20'. Further, the memory unit 228 of the radio communication device 20 stores a plurality of data in association with distance information. The radio communication device 20 can thereby appropriately select data from the plurality of data stored in association with distance information by using the estimated distance information on the distance from the radio communication device 20' and transmit the data to the radio communication device 20'.

[3-3] Third Embodiment

A third embodiment is described hereinafter. The communication system 1 according to the third embodiment is composed of the radio communication devices 20 and 20' as shown in FIG. 1, just like in the first and second embodiments. In this embodiment, the radio communication device 20 that has received a radio signal from the radio communication device 20' estimates distance information on the distance from the radio communication device 20' and transmits the distance information to the radio communication device 20'. The radio communication device 20' selects data based on the distance information received from the radio communication device 20 and further transmits the selected data to the radio communication device 20.

Figure 22:
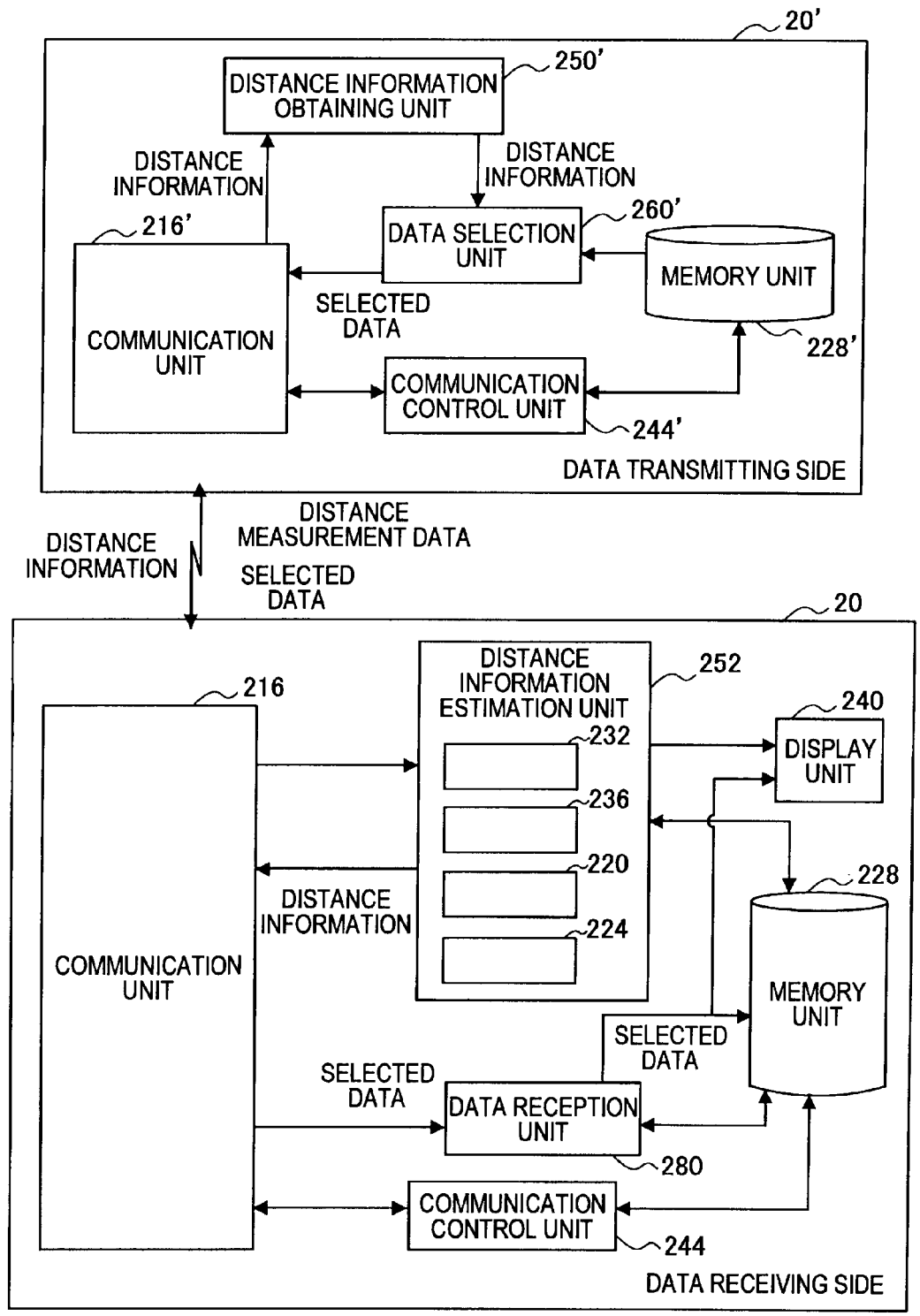
FIG. 22 is a block diagram showing an example of a functional layout for data selection according to a third embodiment.

FIG. 22 is a functional block diagram showing a logical functional layout of the radio communication devices 20 and 20' according to the embodiment. As shown in FIG. 22, the radio communication device 20 includes a communication unit 216, a memory unit 228, a display unit 240, a communication control unit 244, a distance estimation unit 252, and a data reception unit 280.

The communication unit 216, the display unit 240 and the communication control unit 244 have the same functions as those described in relation to the first embodiment. The memory unit 228 stores the field intensity for distance estimation, the noise floor value, the device information associated with a threshold value, an evaluation formula or the like as described above, and further stores selected data received from other radio communication device 20'.

In this embodiment, the distance estimation unit 252 includes a field intensity measurement unit 220, a noise floor measurement unit 224, an estimation unit 232 and a determination unit 236, and estimates distance information on the distance from the radio communication device 20' based on a radio signal by using the process described with reference to FIGS. 3 to 16. Note that the field intensity measurement unit 220, the noise floor measurement unit 224, the estimation unit 232 and the determination unit 236 and the other elements are respectively connected as shown in FIG. 4; however, the illustration of such a connection relationship is omitted in FIG. 22 in terms of clarifying the drawing. The configuration of the distance estimation unit 252 is not limited to the configuration shown in FIG. 22. The distance estimation unit 252 may estimate distance information on the distance from the radio communication device 20' by a process different from the process described with reference to FIGS. 3 to 16.

The data reception unit 280 receives the above-described selected data from the radio communication device 20' through the communication unit 216, for example, and outputs it to the display unit 240 or the memory unit 228.

On the other hand, as shown in FIG. 22, the radio communication device 20' includes a communication unit 216', a memory unit 228', a communication control unit 244', a distance information obtaining unit 250' and a data selection unit 260'.

The distance information obtaining unit 250' of the radio communication device 20' obtains the distance information received from the radio communication device 20 through the communication unit 216' and passes it to the data selection unit 260'. The distance information obtaining unit 250' in this embodiment may not include the field intensity measurement unit 220, the noise floor measurement unit 224, the estimation unit 232 and the determination unit 236.

The data selection unit 260' selects data from a plurality of data stored in the memory unit 228' based on the distance information obtained by the distance information obtaining unit 250', and transmits the selected data to the radio communication device 20 through the communication unit 216'. The other elements of the radio communication device 20' have the same functions as those described in relation to the first and second embodiments.

Figure 23:
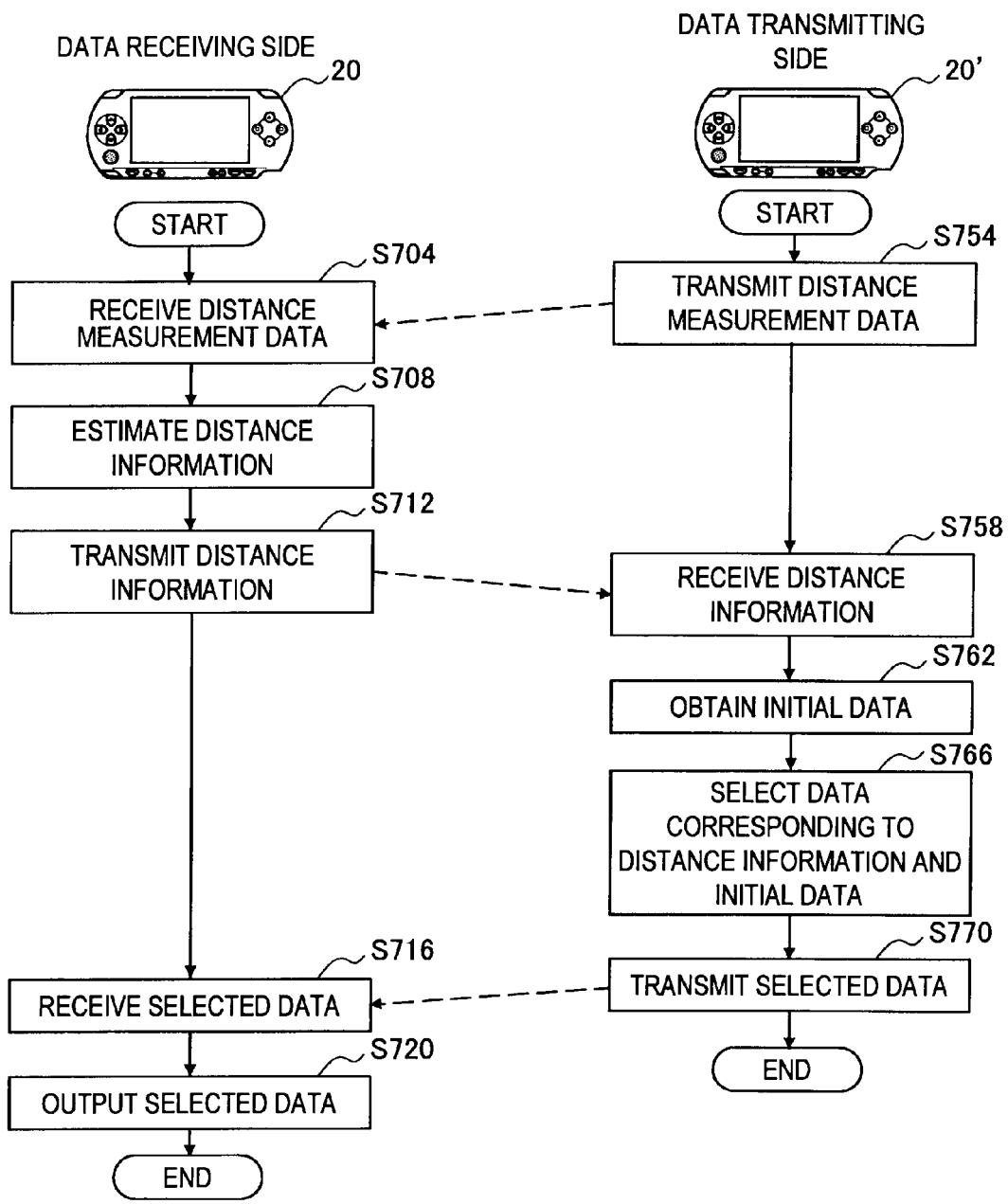
FIG. 23 is a flowchart showing an example of an operation flow related to data selection.

FIG. 23 is a flowchart showing an operation flow of the radio communication device 20' on the data transmitting side and the radio communication device 20 on the data receiving side in this embodiment.

As shown in FIG. 23, the communication control unit 244' of the radio communication device 20' transmits distance measurement data to the radio communication device 20 (S754). The distance measurement data transmission processing corresponds to the process from obtaining the device information (S304) to transmitting the distance measurement packet (S316) which is described in detail with reference to FIG. 14.

The distance measurement data transmitted from the radio communication device 20' is received by the communication unit 216 of the radio communication device 20 (S704). The distance measurement data reception processing corresponds to the process from receiving the device information (S404) to recording the field intensity and the noise floor (S428) which is described in detail with reference to FIG. 15.

After that, the distance estimation unit 252 of the radio communication device 20 estimates distance information on the distance from the radio communication device 20' by using the distance measurement data, i.e., the distance measurement packet, the device information or the like received from the radio communication device 20' (S708). The distance information estimation processing in the distance estimation unit 252 of the radio communication device 20 corresponds to the process from obtaining the field intensity and the noise floor (S450) to estimating the distance (S486) which is described in detail with reference to FIG. 16. The distance information estimated in the distance estimation unit 252 is transmitted to the radio communication device 20' through the communication unit 216 (S712).

The distance information transmitted from the radio communication device 20 is received by the communication unit 216' of the radio communication device 20' and obtained by the distance information obtaining unit 250' (S758). The distance information obtaining unit 250' passes the obtained distance information to the data selection unit 260'. Further, the data selection unit 260' of the radio communication device 20' obtains initial data by reading the initial data prestored in the memory unit 228, for example (S762). Obtaining the initial data (S762) may be performed before receiving the distance information (S758).

After the distance information is received and the initial data is obtained, the data selection unit 260' selects data corresponding to the passed distance information and initial data from a plurality of data stored in the memory unit 228' as described with reference to FIG. 18, for example (S766).

The data selected by the data selection unit 260' based on the distance information and the initial data is transmitted from the communication unit 216' to the radio communication device 20 (S770). After that, the selected data is received by the data reception unit 280 through the communication unit 216 of the radio communication device 20 (S716). Then, the selected data is output from the data reception unit 280 to the display unit 240 or the memory unit 228 (S720).

As described above, in the third embodiment, the radio communication device 20' on the data transmitting side includes the distance information obtaining unit 250'. The distance information obtaining unit 250' receives and obtains the distance information transmitted from the radio communication device 20. Further, the memory unit 228' of the radio communication device 20' stores a plurality of data in association with distance information. The radio communication device 20' can thereby appropriately select data from the plurality of data stored in association with distance information by using the distance information on a distance from the radio communication device 20 and transmit the data to the radio communication device 20.

On the other hand, the radio communication device 20 on the data receiving side includes the distance estimation unit 252, and estimates distance information based on the field intensity of a radio signal that is determined to satisfy a predetermined condition about a noise component among received radio signals. The distance estimation unit 252 can transmit the estimated distance information to the radio communication device 20' through the communication unit 216 so that the radio communication device 20' selects data based on the estimated distance information.

[3-4] Fourth Embodiment

A fourth embodiment is described hereinafter. The communication system 2 according to the fourth embodiment includes the radio communication device 30, the relay device 32 and the communication device 34 as shown in FIG. 2. In this embodiment, the radio communication device 30 that has received a radio signal from the relay device 32 estimates a distance from the relay device 32 and transmits the distance information to the communication device 34. The communication device 34 selects data based on the distance information received from the radio communication device 30 and further transmits the selected data to the radio communication device 30.

Figure 24:
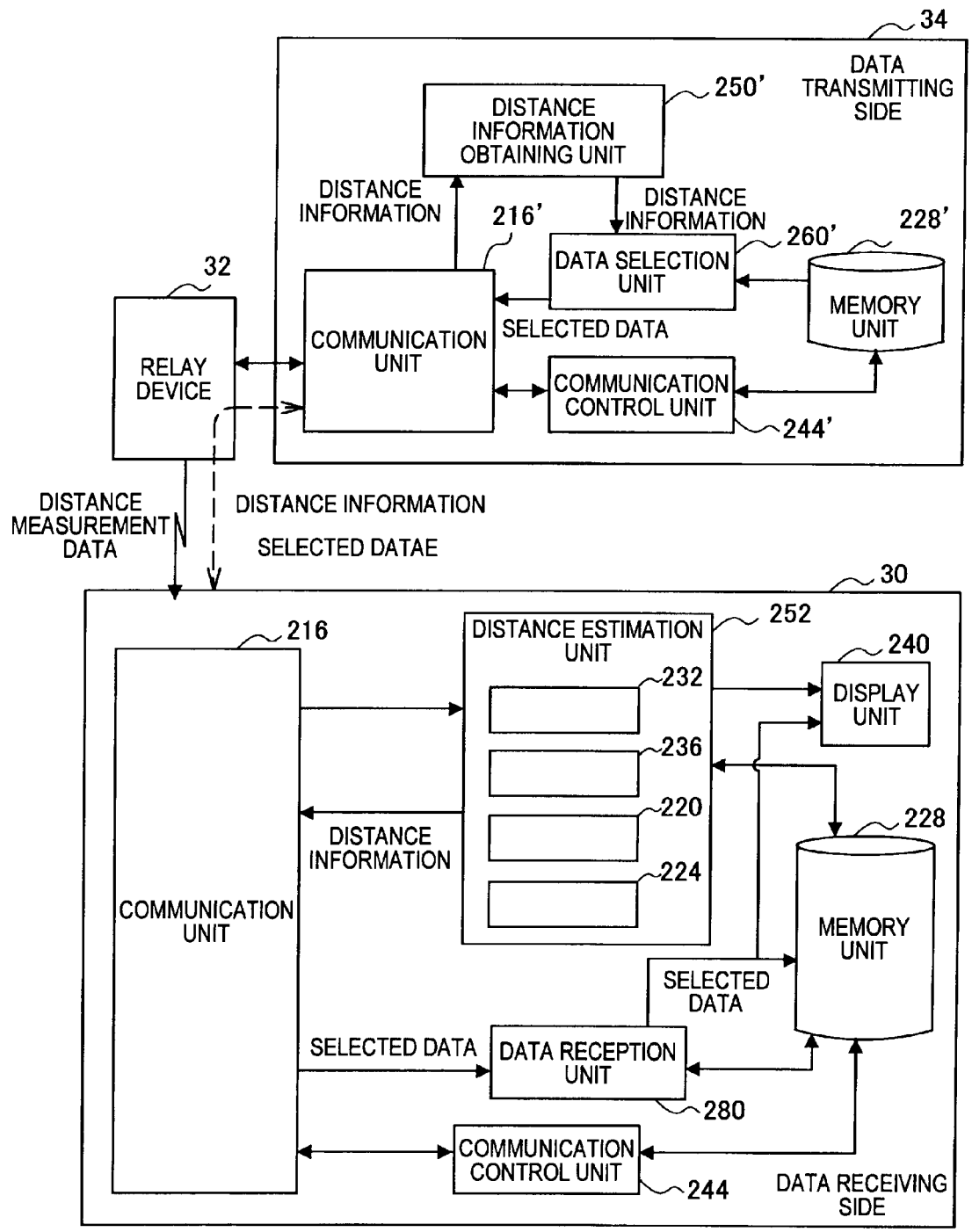
FIG. 24 is a block diagram showing an example of a functional layout for data selection according to a fourth embodiment.

FIG. 24 is a functional block diagram showing a logical functional layout of the radio communication device 30, the relay device 32 and the communication device 34 according to the embodiment.

Referring to FIG. 24, the radio communication device 30 has the functional layout similar to that of the radio communication device 20 of the third embodiment shown in FIG. 22. Further, the communication device 34 has the functional layout similar to that of the radio communication device 20' of the third embodiment shown in FIG. 22. Thus, the functional layout of the radio communication device 30 and the communication device 34 is described only for a part different from that of the third embodiment.

In this embodiment, the communication unit 216 of the radio communication device 30 and the communication unit 216' of the communication device 34 perform communication via the relay device 32. As described with reference to FIG. 2, the radio communication device 30 and the relay device 32 are connected wirelessly by a wireless LAN in the standard specification such as IEEE 802.11a, b, g, n, for example. The wireless connection between the radio communication device 30 and the relay device 32 in this embodiment is typically established by an infrastructure mode. The relay device 32 and the communication device 34 are connected over an arbitrary communication network by wire or wireless.

In this embodiment, the distance estimation unit 252 of the radio communication device 30 estimates a distance from the relay device 32, not the communication device 34, by using the radio signal transmitted from the relay device 32. Distance estimation in the distance estimation unit 252 is performed by the process described with reference to FIGS. 3 to 16. The configuration of the distance estimation unit 252 is not limited to the configuration shown in FIG. 24. The distance estimation unit 252 may estimate distance information on a distance from the relay device 32 by a process different from the process described with reference to FIGS. 3 to 16.

The distance information estimated in the distance estimation unit 252 of the radio communication device 30 is wirelessly transmitted from the communication unit 216 to the relay device 32, and the relay device 32 relays the distance information to the communication device 34. The distance information obtaining unit 250' of the communication device 34 obtains the relayed distance information and passes it to the data selection unit 260'. The data selection unit 260' of the communication device 34 selects data from a plurality of data stored in the memory unit 228' based on the distance information passed from the distance information obtaining unit 250'. After that, the selected data is transmitted to the relay device 32 through the communication unit 216'. The relay device 32 then relays the selected data to the radio communication device 30.

FIG. 25 shows the way that the memory unit 228' according to the embodiment stores a plurality of data. Referring to FIG. 25, the memory unit 228' stores several kinds of advertisement information to be distributed in an advertisement distribution system or the like as data. The advertisement information is associated with categories of long distance, medium distance and short distance as distance information.

As shown in FIG. 25, the memory unit 228' can store a plurality of data without using initial data. Further, the number of data stored or selected in the each category of distance information is not necessarily the same. For example, in FIG. 25, the distance information indicating a long distance is associated with a product name of a product to be advertised and a product image (image data). Likewise, the distance information indicating a medium distance is associated with an overview description of a product and a motion picture advertisement (video data). The distance information indicating a short distance is associated with a detailed description of a product and a motion picture advertisement (video data) and further with bonus information upon product purchase.

Those data may be a data body, an identifier uniquely identifying data, URL indicating a storage location of data or the like. Further, a plurality of data may be associated not with the category of distance but with information derived from the distance information by a given calculation formula, information related to a change over time of the distance information, stay time information when the radio communication device 30 stays in a given range (short distance, medium distance etc.) or the like, for example.

FIG. 26 is a flowchart showing an operation flow of the radio communication device 30, the relay device 32 and the communication device 34 according to the embodiment.

As shown in FIG. 26, the radio communication device 30 first transmits connection destination search data to the vicinity of its own device from the communication unit 216 and searches for a connectable relay device (S800). The relay device 32 receives the connection destination search data transmitted from the radio communication device 30 (S850) and transmits distance measurement data to the radio communication device 30 (S854).

The distance measurement data transmitted from the relay device 32 is received by the communication unit 216 of the radio communication device 30 (S804). After that, the distance estimation unit 252 of the radio communication device 20 estimates distance information on a distance from the communication device 34 by using the distance measurement data received from the radio communication device 20' (S808). The distance information estimated by the distance estimation unit 252 is transmitted to the communication device 34 through the communication unit 216 (S812).

The distance information transmitted from the radio communication device 30 is received by the communication unit 216' of the communication device 34 and obtained by the distance information obtaining unit 250' (S858). The distance information obtaining unit 250' passes the obtained distance information to the data selection unit 260'. Then, the data selection unit 260' of the communication device 34 selects data from a plurality of data stored in the memory unit 228' based on the passed distance information, as described with reference to FIG. 25 (S862). For example, when the distance between the radio communication device 30 and the relay device 32 is a short distance, the data selection unit 260' selects the detailed description of a product, the motion picture advertisement and the bonus information.

The data selected by the data selection unit 260' based on the distance information is transmitted from the communication unit 216' to the radio communication device 30 (S866). After that, the selected data is received by the data reception unit 280 through the communication unit 216 of the radio communication device 30 (S816). Then, the selected data is output from the data reception unit 280 to the display unit 240 or the memory unit 228 (S820).

As described above, in the fourth embodiment, the communication device 34 includes the distance information obtaining unit 250'. Then, the distance information obtaining unit 250' receives and obtains the distance information transmitted from the radio communication device 30. Further, the memory unit 228' of the communication device 34 stores a plurality of data in association with distance information. The communication device 34 can thereby appropriately select data from the plurality of data stored in association with distance information by using the distance information between the radio communication device 30 and the communication device 34 and transmit the data to the radio communication device 30.

On the other hand, the radio communication device 30 includes the distance estimation unit 252. The distance estimation unit 252 estimates distance information on the distance from the relay device 32 based on the field intensity of a radio signal that is determined to satisfy a predetermined condition about a noise component among the radio signals received from the relay device 32. Then, the estimated distance information on the distance from the relay device 32 is transmitted to the communication device 34 so that the communication device 34 selects data based on the distance information.

[4] Summary

In the foregoing, four embodiments for appropriately selecting data based on distance information on a distance from a radio communication device are described. For example, in the communication system 1 according to the first embodiment (or the second, third embodiment) shown in FIG. 1, a pair of game terminal machines for performing a network game may be the radio communication devices 20 and 20'. In this case, the distance information transmitted/received between the radio communication devices 20 and 20' can be regarded as the closeness between users communicating with each other in the game, for example. In such a case, by appropriately selecting data to be passed based on the distance information corresponding to the closeness between users, it is possible to provide a game with more entertainment.

Further, in the communication system 2 according to the fourth embodiment shown in FIG. 2, the relay device 32 can be mounted as a fixed wireless access point placed in a store, and the communication device 34 can be mounted as a management server for managing data in a concentrated manner, for example. Further, a portable terminal held by a user can be used as the radio communication device 30. In this case, the distance information estimated by the radio communication device 30 and transmitted to the communication device 34 indicates the distance between the user having the portable terminal and the wireless access point placed in the store. In such a case, a product name and a product image can be distributed as advertisement information to a terminal of the user located at a long distance, more detailed advertisement can be distributed to the user coming closer with interest, and bonus information promoting product purchase can be distributed to the user coming to a short distance, for example.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, although the case where the estimation unit 232 estimates the distance from the radio communication device 20' as a long distance, a medium distance or a short distance in the estimation of distance information based on a radio signal is described above, the estimation unit 232 may estimate the distance from the radio communication device 20' in units of m (meters). Further, the determination unit 236 may perform filtering based on the amount of noise component such as SN ratio of distance measurement packets, for example, rather than filtering based on the noise floor.

Further, it is not always necessary to perform each step in the processes according to the first to fourth embodiments in this specification according to the sequences shown as the flowcharts. For example, each step in the processing of the radio communication devices 20 and 20' may include processing performed in parallel or individually (e.g. parallel processing or object processing).

Furthermore, it is possible to create a computer program that causes hardware such as the CPU 201 incorporated in the radio communication device 20, the radio communication device 20', the radio communication device 30, the relay device 32 or the communication device 34 to function equally to the respective elements described above. Further, a memory medium that stores such a computer program may be provided. Each functional block shown in the functional block diagrams of FIGS. 4, 17 20, 22 and 24 may be implemented by hardware, thereby achieving a series of processing on hardware.

The invention claimed is:

1. A communication device comprising:
a memory unit that stores a plurality of data;
a distance information obtaining unit comprising:
a reception unit that receives a radio signal transmitted from a second communication device;
a measurement unit that measure a field intensity of the radio signal;
a noise floor measurement unit that measures a noise component of the radio signal;
a determination unit that determines whether the noise component satisfies a predetermined condition; and
an estimation unit that estimates a distance from the second communication device based on the field intensity of the radio signal; and
a data selection unit that selects data from the plurality of data stored in the memory unit based on the measured field intensity, noise component determination, and estimated distance.

2. The communication device according to claim 1, wherein
the memory unit stores the plurality of data by associating certain attributes of the plurality of data and the distance information.

3. The communication device according to claim 1, wherein
the data selection unit selects data having an attribute value included in a first range when the distance information indicates a long distance, and selects data having an attribute value included in a second range when the distance information indicates a short distance.

4. The communication device according to claim 1, wherein
the memory unit stores the plurality of data in association with distance information with respect to each initial data received from the other radio communication device, and
the data selection unit selects data based on initial data received from the other radio communication device and the distance information.

5. The communication device according to claim 1, wherein
the distance information is distance information between the other radio communication device and a relay device.

6. The radio communication device according to claim 1, wherein
the reception unit receives device information indicating a transmitting power of a radio signal of the other radio communication device in advance from the other radio communication device, and
the estimation unit estimates a distance from the other radio communication device by using the device information.

7. The radio communication device according to claim 6, wherein
the estimation unit calculates an average value of field intensities of radio signals determined to satisfy a predetermined condition by the determination unit, determines in which categorized range of an average value the average value is included, and estimates that the distance from the other radio communication device is a distance corresponding to a range of an average value determined to include the average value.

8. A non-transitory, computer-readable medium comprises instructions for causing a computer to perform the steps of:
receiving a radio signal transmitted from a second communication device;
measuring a field intensity of the radio signal
measuring a noise component of the radio signal;
determining whether the noise component satisfies a predetermined condition
estimating a distance from the second communication device based on the field intensity of the radio signal; and
selecting data from a plurality of data stored in a memory unit based on the measured field intensity, noise component determination, and estimated distance.

9. A data selection method in a communication device comprising the steps of:
receiving a radio signal transmitted from a second communication device;
measuring a field intensity of the radio signal
measuring a noise component of the radio signal;
determining whether the noise component satisfies a predetermined condition
estimating a distance from the second communication device based on the field intensity of the radio signal; and
selecting data from a plurality of data stored in a memory unit based on the measured field intensity, noise component determination, and estimated distance.

10. A communication system comprising:
a communication device comprising:
a memory unit that stores a plurality of data,
a distance information obtaining unit comprising:
a reception unit that receives a radio signal transmitted from a second communication device;

a measurement unit that measure a field intensity of the radio signal;
a noise floor measurement unit that measures a noise component of the radio signal;
a determination unit that determines whether the noise component satisfies a predetermined condition; and
an estimation unit that estimates a distance from the second communication device based on the field intensity of the radio signal;
a data selection unit that selects data from the plurality of data stored in the memory unit based on the distance information obtained by the distance information obtaining unit; and
the radio communication device that performs radio communication with the communication device.

* * * * *